US011892018B2

(12) United States Patent
Farrar et al.

(10) Patent No.: US 11,892,018 B2
(45) Date of Patent: Feb. 6, 2024

(54) APPARATUS FOR HOLDING ARTWORK

(71) Applicant: CRATEIGHT LIMITED, London (GB)

(72) Inventors: Peter Antony Farrar, Leeds (GB); John Hein, Leeds (GB); Andrew Nikita Cunynghame Stramentov, London (GB); Anthony Henry Joseph Fraser, Rutland (GB)

(73) Assignee: CRATEIGHT LIMITED, London (GB)

( * ) Notice: Subject to any disclaimer, the term of this patent is extended or adjusted under 35 U.S.C. 154(b) by 80 days.

(21) Appl. No.: 17/587,152

(22) Filed: Jan. 28, 2022

(65) Prior Publication Data
US 2022/0154746 A1 May 19, 2022

Related U.S. Application Data

(63) Continuation of application No. PCT/GB2020/051824, filed on Jul. 30, 2020.

(30) Foreign Application Priority Data

Jul. 30, 2019 (GB) ...................................... 1910854

(51) Int. Cl.
*F16B 2/12* (2006.01)
*B65D 25/10* (2006.01)
*B65D 85/30* (2006.01)
*F16B 21/02* (2006.01)

(52) U.S. Cl.
CPC .............. *F16B 2/12* (2013.01); *B65D 25/102* (2013.01); *B65D 85/30* (2013.01); *F16B 21/02* (2013.01)

(58) Field of Classification Search
CPC .......... F16B 2/12; F16B 21/02; B65D 25/102; B65D 85/30
See application file for complete search history.

(56) References Cited

U.S. PATENT DOCUMENTS 4,156,498 A * 5/1979 Miller .................... B44D 3/185
206/451
5,326,147 A * 7/1994 Watson .................... B44D 7/00
294/162

(Continued)

FOREIGN PATENT DOCUMENTS

| EP | 3239065 | 11/2017 |
| WO | WO 2018/115808 | 6/2018 |
| WO | WO 2018/115809 | 6/2018 |

*Primary Examiner* — Anita M King
(74) *Attorney, Agent, or Firm* — Levine Bagade Han LLP

(57) ABSTRACT

An apparatus for use in holding artwork during transportation or storage, comprising: a substantially flat mounting panel provided with a plurality of retention members; and at least one clamp, configured to be moveable between an unengaged state, in which artwork can be removed from the apparatus, and an engaged state, in which the clamp secures the artwork to the apparatus; wherein the clamp comprises a base, configured to be secured to the mounting panel, and a gripping section; and when artwork is secured to the apparatus, a first side of the artwork is supported on the mounting panel and the gripping section of the clamp presses on a second side of the artwork, opposite to the first side of the artwork.

20 Claims, 19 Drawing Sheets

(56) References Cited

U.S. PATENT DOCUMENTS

| | | | |
|---|---|---|---|
| 5,433,414 A * | 7/1995 | Vieira | H04R 1/026 |
| | | | 248/316.4 |
| 6,065,603 A | 5/2000 | Filice et al. | |
| 9,221,296 B2 * | 12/2015 | Duffy | B44D 3/04 |
| 11,185,176 B2 * | 11/2021 | Farrar | F16B 21/02 |
| 11,291,317 B2 * | 4/2022 | Weitsman | B25H 7/045 |
| 2012/0304424 A1 | 12/2012 | Yang | |
| 2015/0034501 A1 * | 2/2015 | Duffy | B44D 3/04 |
| | | | 29/432 |

* cited by examiner

Fig. 8A
Fig. 8B
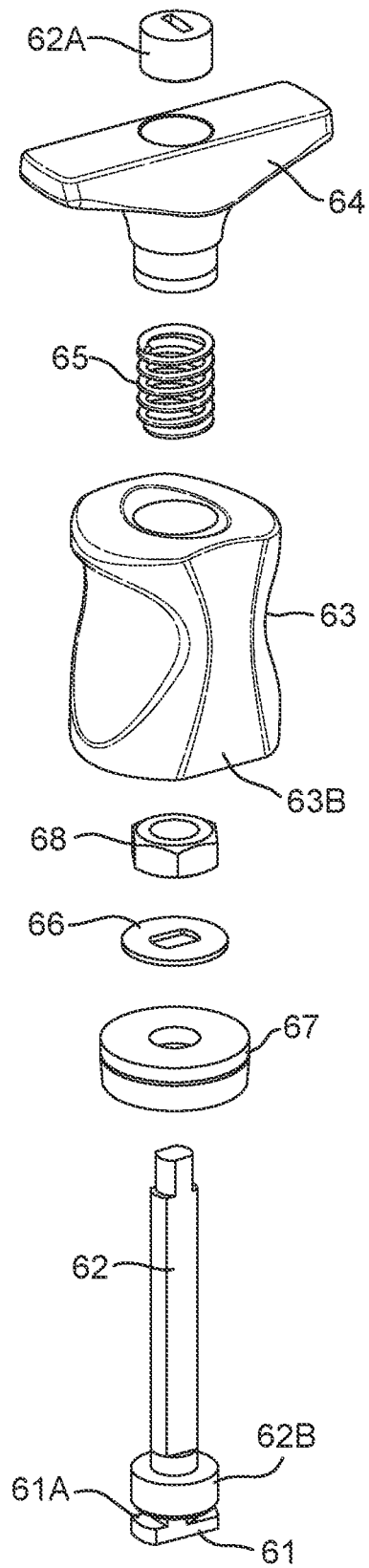
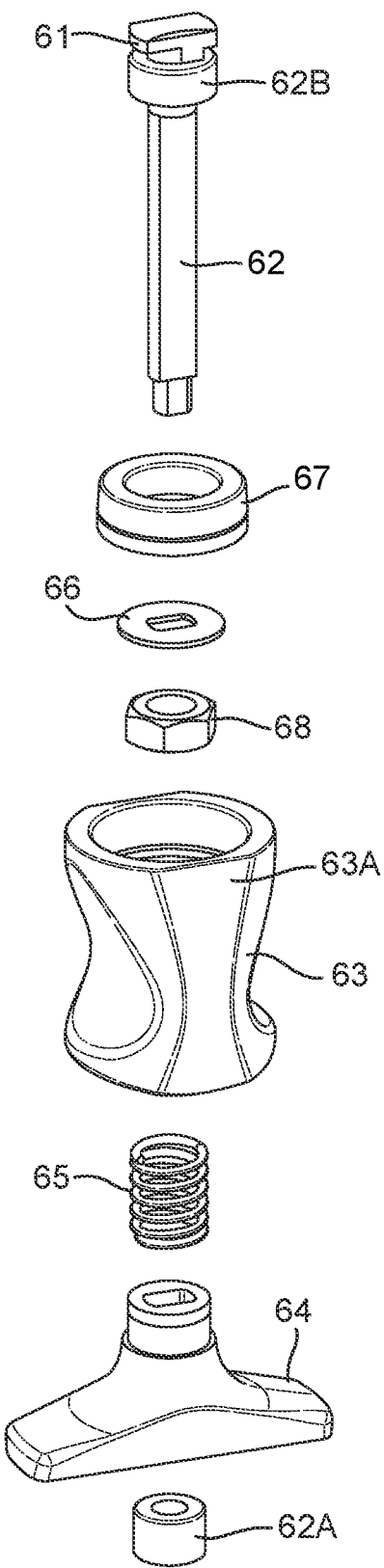

APPARATUS FOR HOLDING ARTWORK

CROSS-REFERENCE TO RELATED APPLICATIONS

This application is a continuation of International Patent Application Number PCT/GB2020/051824 filed Jul. 30, 2020, which claims the benefit of priority to GB 1910854.7 filed Jul. 30, 2019, the contents of which are incorporated herein by reference in their entireties.

TECHNICAL FIELD

This invention relates to apparatus for use in holding artwork during transportation and storage and in particular mounting an artwork to a mounting panel which may be housed within a container used for use in storing and transporting the artwork.

BACKGROUND

It is known to secure a fastening device to the rear surface of the frame of an artwork. The fastening device is then used to secure the artwork to a mounting panel which in turn may be housed in a container, often constructed from wood. In other arrangements, the artwork may be wrapped in in a layer of acid free paper and a layer of soft material, e.g. bubble wrap, and then housed in a sleeve, e.g. made from cardboard. This package may then be housed in the container. The package may be held on a bed of foam in the container or the corners of the package may be held within the corners of the container by blocks of resilient material.

Such known packaging is usually assembled and constructed by specialist art packaging and shipping firms and in many cases the container is effectively custom built for the particular application. Such packaging can thus be very expensive. Also, as the artwork may be of very high value, insurance companies have a significant influence over the manner in which the artwork is packed.

SUMMARY

According to the present invention, there is provided apparatus and a container for holding artwork as specified in the claims.

BRIEF DESCRIPTION OF THE DRAWINGS

Embodiments of the invention will now be described, by way of example only, with reference to the accompanying drawings in which corresponding reference symbols indicate corresponding parts, and in which:

FIG. 3C a perspective view from one side and FIG. 4B being a side view, partially in cross-section;

FIGS. 8A and 8B are exploded perspective views of the securing device of the apparatus viewed from above and from beneath;

DETAILED DESCRIPTION

Figure 1A:
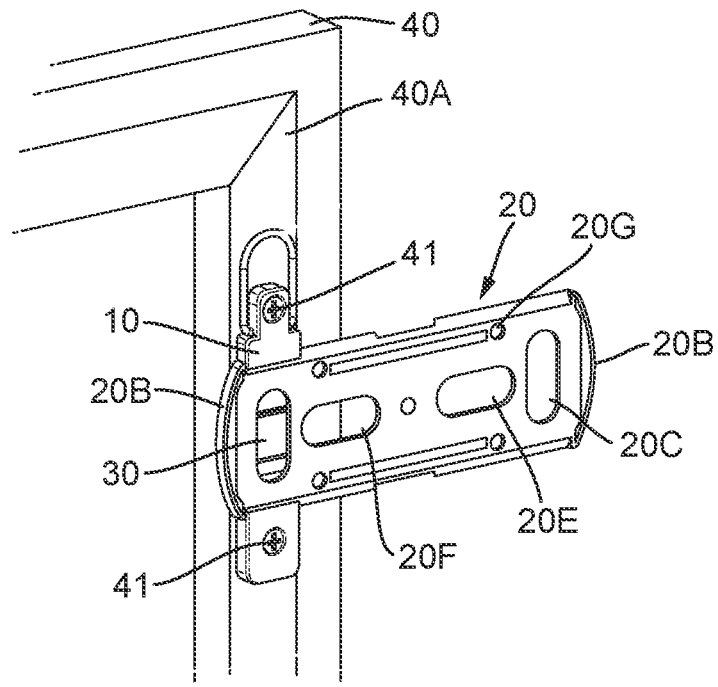
FIGS. 1A to 1D are perspective views of a fastening device used in connection with apparatus for holding an artwork.
Figure 1B:
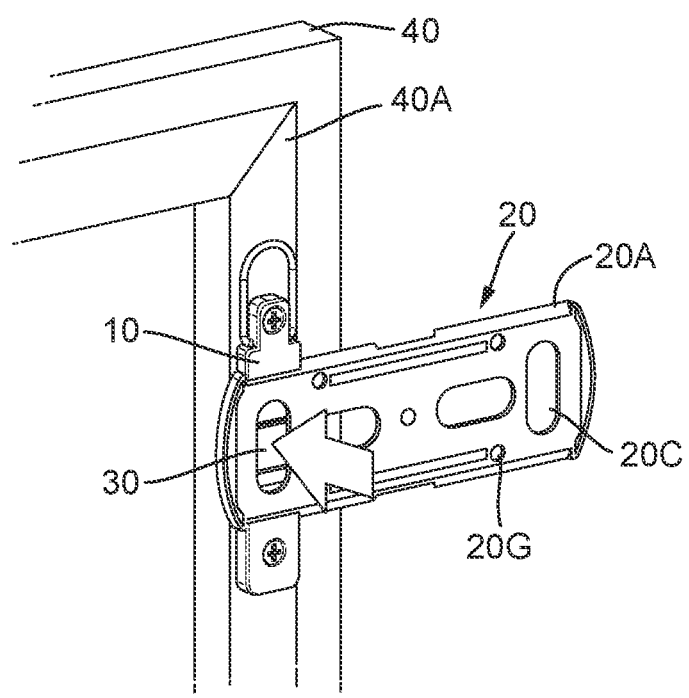
Figure 1C:
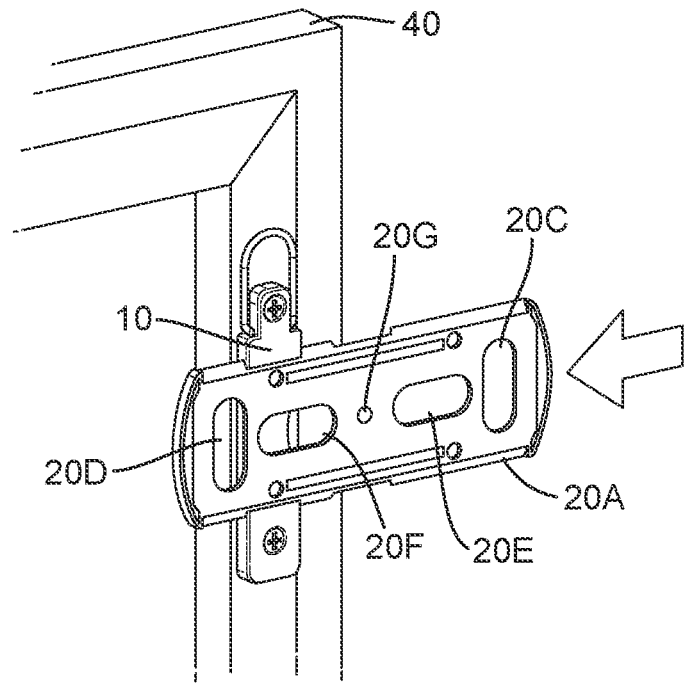

The apparatus described herein is designed to hold an artwork during transportation and storage. WO 2018/115809 discloses an arrangement for holding artwork having a frame to which a plurality of fastening devices have been secured, each fastening device having an aperture in a part which protrudes from a side of the frame. FIGS. 1A to 1C show artwork with such a fastening device secured thereto.

The fastening device shown in FIG. 1A comprises a first component 10 and a second component 20. The first component 10 is in the form of a metal plate which is secured to a rear surface of a picture frame of an artwork, e.g., by screws. The second component 20 is also in the form of a metal plate and is slidably mounted to the first plate. The fastening device also comprises a resilient member in the form of a spring clip 30 which, forms part of limiting means for inhibiting sliding movement of the second component 20 relative to the first component 10.

FIG. 1A shows the fastening device when secured to a rear surface 40A of the frame 40 of an artwork. The fastening device comprises a first component 10 and a second component 20. The first component 10 may be in the form of a metal plate which is securable to a rear surface 40A of a picture frame 40 of an artwork, e.g., by screws 41. The second component 20 may also be in the form of a metal plate and arranged to be slidably mounted to the first plate.

As shown in FIGS. 1A-1D and 2, the second component 20 comprises first and second elongate apertures 20C, 20D, these apertures being elongated in a direction substantially perpendicular to the length of the second component 20, third and fourth elongate apertures which are elongated in a direction substantially parallel to the length of the second component 20, and a plurality of screw holes 20G.

Figure 1D:
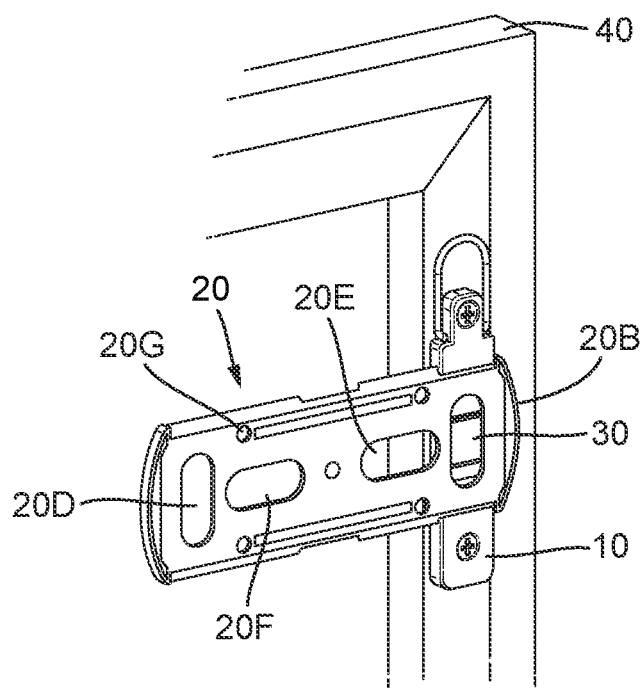

The fastening device also comprises a spring clip 30 which releasably holds the second component 20 in an extended position (as shown in FIG. 1A) and a retracted position (as shown in FIG. 1D) relative to the frame 40 of the artwork and which may be used inhibit the second component 20 from sliding too far and becoming detached from the first component 10. Abutments 20B at the ends of the second component 20 may also be used to prevent the second component 20 from sliding out of the first component 10.

As mentioned, FIG. 1A shows the second component 20 in an extended, or protruding, position in which it projects beyond the edge of the frame 40. The second component 20 is releasably held in the extended position by engagement of the spring clip 30 with the second elongate aperture 20D of the second component.

To move the second component 20 from the extended position to the retracted position, the spring clip 30 is pressed, e.g., by a user's finger, through the second elongate aperture 20D to depress it and disengage it from the aperture (as illustrated by the arrow in FIG. 1B). The second component 20 can then be slid towards the retracted position (as illustrated by the arrow in FIG. 1C). FIG. 1D shows the second component 20 in the retracted position in which it no longer projects from the side of the frame 40 of the artwork. As described above, the second component 20 is releasably held in the retracted position by engagement of the spring clip 30 in the first elongate aperture 20C. It can be released from this position so it can be slid toward the extended position in the same manner as described in relation to FIG. 1B.

Figure 2:
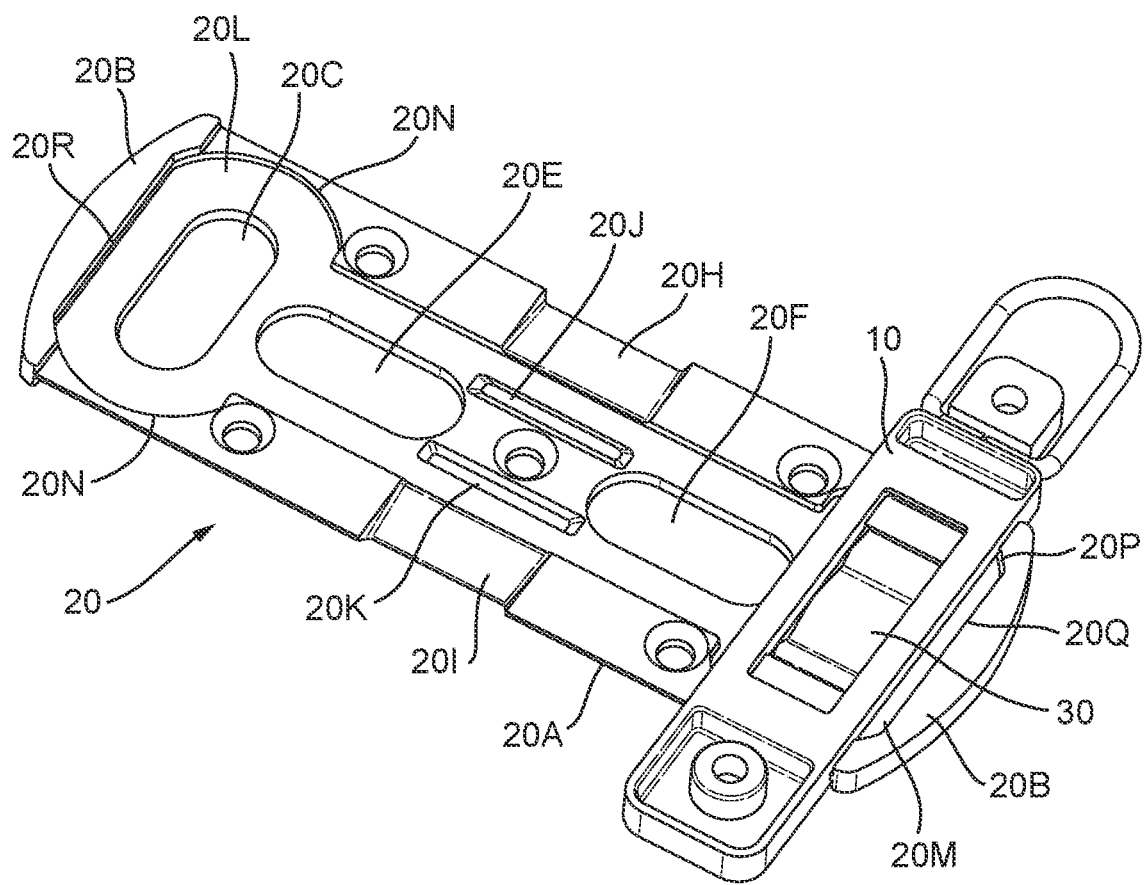
FIG. 2 is a perspective view of the underside of the fastening device shown in FIG. 1.
Figure 3A:
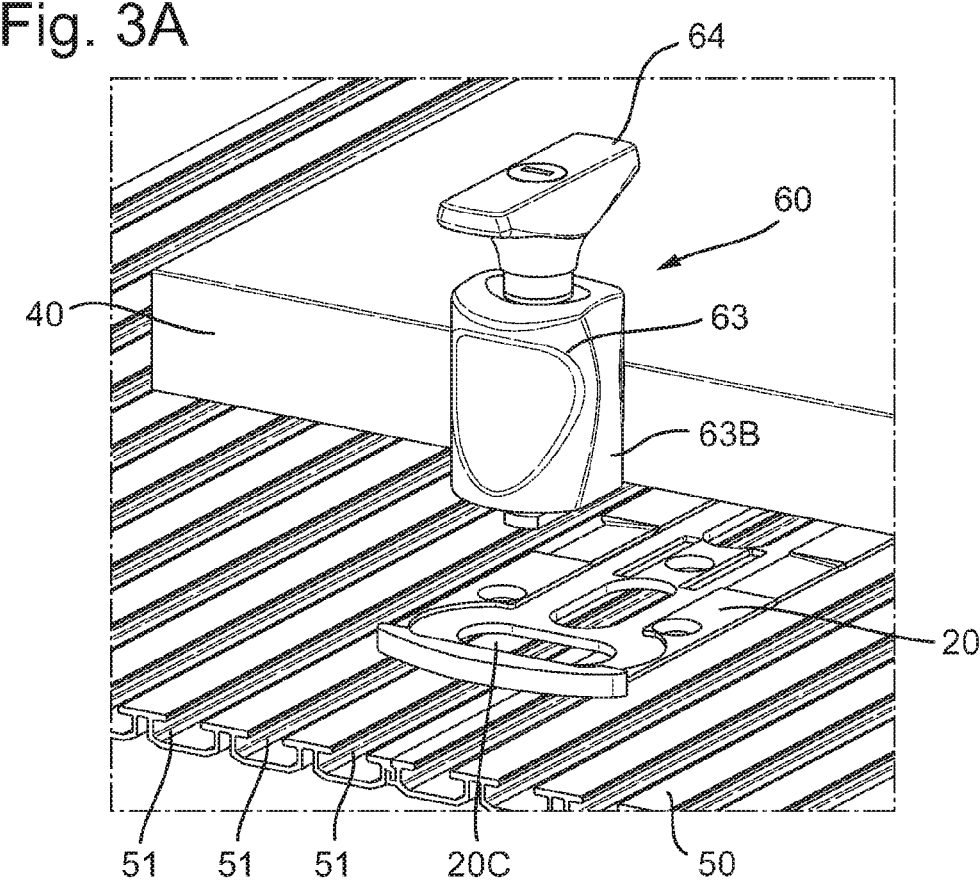
FIGS. 3A to 3D show an arrangement for use in holding an artwork in conjunction with the fastening device shown in FIGS. 1A-1D and 2, FIG. 3A being a perspective view, FIG. 3B being a front view.
Figure 3B:
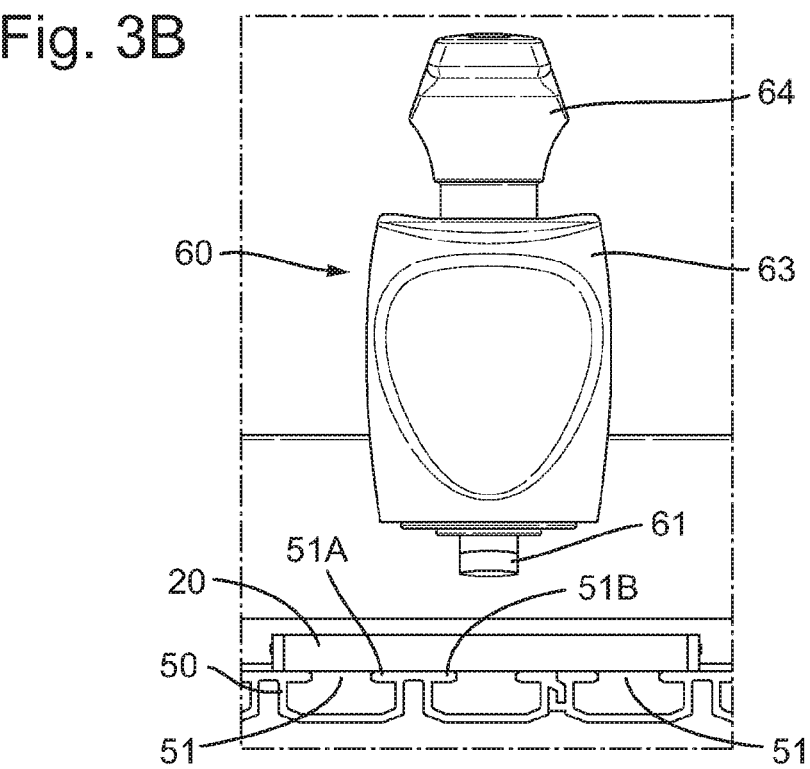
Figure 3C:
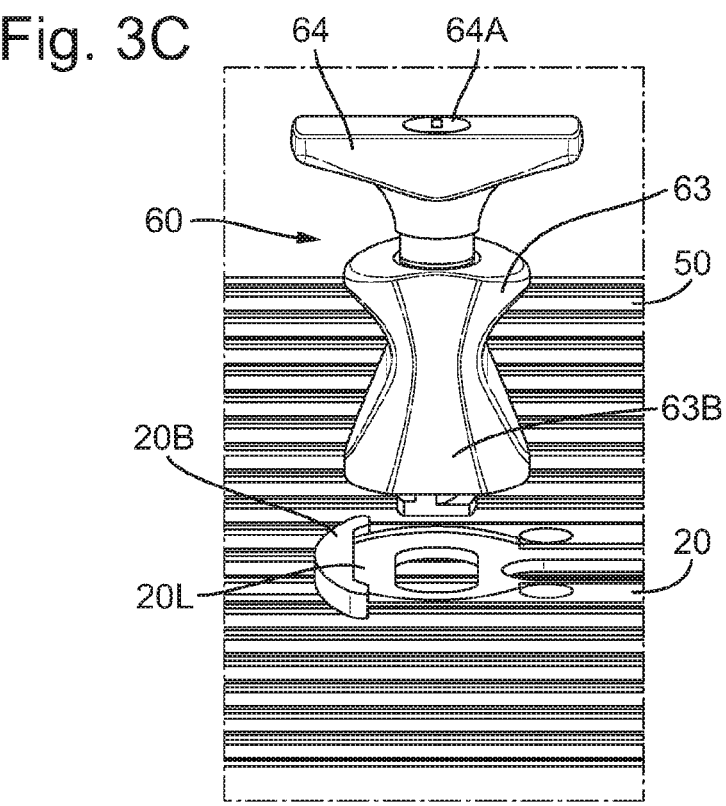
Figure 3D:
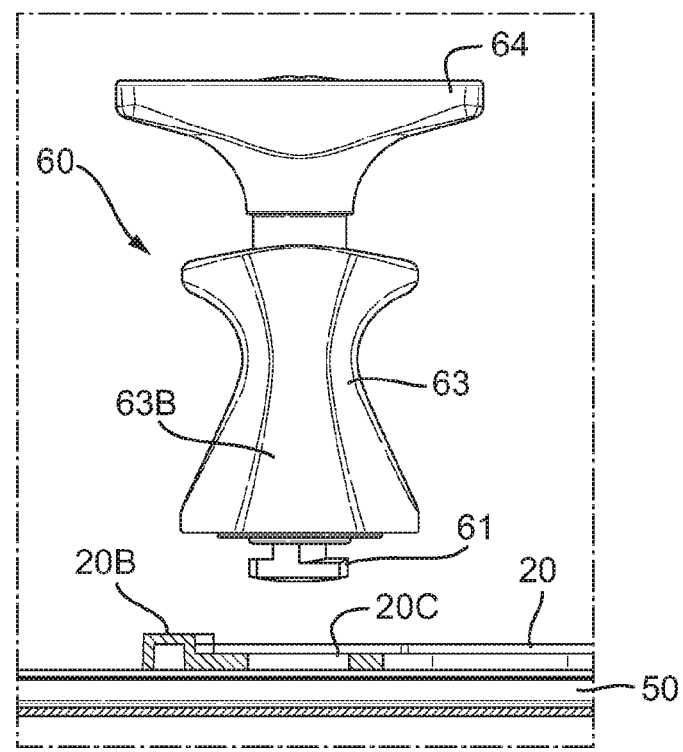

FIG. 2 shows the underside of the second component 20. This figure shows the first and second abutments 20B, the first and second elongate apertures 20C, 20D, and the third and fourth elongate apertures 20E, 20F mentioned above. FIG. 2 also shows first and second recesses 20H, 20I which interrupt angled edges 20A of the second component which enable the second component to be assembled with the first component (as described further in WO 2018/115810). FIG. 2 also shows first and second grooves 20J, 20K for engaging with the spring clip 30 when the second component 20 is in a central position (midway between the extended and retracted positions) and third and fourth recesses 20L, 20M in the underside of the second component 20 in areas around the first and second elongate apertures 20C, 20D, these recesses 20L, 20M being bordered by partially circular side walls 20N, 20P and a side wall 20Q, 20R which form part of the abutments 20B.

The functions of the various apertures and recesses of the second component 20 will become apparent from the following description of how fastening devices are used to secure the artwork to a mounting panel 50 using a plurality of securing devices 60 and as shown in FIGS. 3A to 7.

FIGS. 3A to 6 illustrate an arrangement of the apparatus for holding an artwork. The apparatus comprises a plurality of securing devices 60, each securing device comprising an engagement part 63 for engaging the second component 20 of the fastening device and a locking part 61 which is rotatable about an axis by means of a handle 64 from a first angular position to a second angular position. The securing device 60 is further illustrated in FIGS. 7A-7B and 8A-8B.

The securing device 60 may be used to secure a respective fastening device to a mounting panel 50 by aligning the aperture 20C in the fastening device with a retention member of the mounting panel 50. The locking part 61 is inserted through the aperture 20C in the fastening device to a position adjacent the retention member so that the engagement part 63 of the securing device engages a surface of the fastening device about the aperture 20C therein. The locking part 61 is then rotated from the first angular position to the second angular position so the locking part 61 engages with and is retained by said retention member (as will be described further below).

The manner in which the securing device is used to hold the artwork on the mounting panel via a fastening device is further described with reference to FIGS. 3A to 7B.

As shown in FIGS. 3A to 7B, the mounting panel 50 may comprise a plurality of retention members with which the securing devices 60 interact to releasably secure the fastening devices (and hence the artwork) to the panel 50. In the arrangement shown, the retention members comprise a series of parallel slots 51 defined by flanges 51A, 51B on each side of the slot 51 as shown in the Figures. The mounting panel 50 may for example comprise an aluminum panel 50 formed by an extrusion process to have a series of parallel slots 51 therein. It will be appreciated that the underside of the second component 20 (as described in relation to FIG. 2), is shown uppermost in FIGS. 3A to 7B as the artwork (and the fastening device attached thereto) has been turned over so the upper surface of the second component 20 engages the mounting panel 50.

As mentioned, the securing device 60 comprises a locking part, e.g., in the form of a T-bar 61, at a distal end of a shaft 62 for engaging in the slots 51 of the mounting panel 50, an engagement part 63 which, in use, engages the fastening device and a handle 64 at the proximal end of the shaft 62 for rotating the T-bar 61 through 90 degrees (as will be described further below). The engagement part 63 is able to move axially a small distance (typically a few mm) relative to the shaft 62 against the action of a spring 65 or other resilient member (see FIGS. 6A-7B) but is arranged to rotate with the shaft 62 as the handle 64 is rotated.

FIGS. 3A to 3D show the fastening device located on the mounting panel 50 so the second component 20 lies substantially parallel to the slots 51 and so that the second elongate aperture 20D thereof lies over one of the slots 51 and it shows the securing device 60, with the T-bar 61 and handle 64 substantially parallel to the slots 51 prior to being engaged with the fastening device.

Figure 4A:
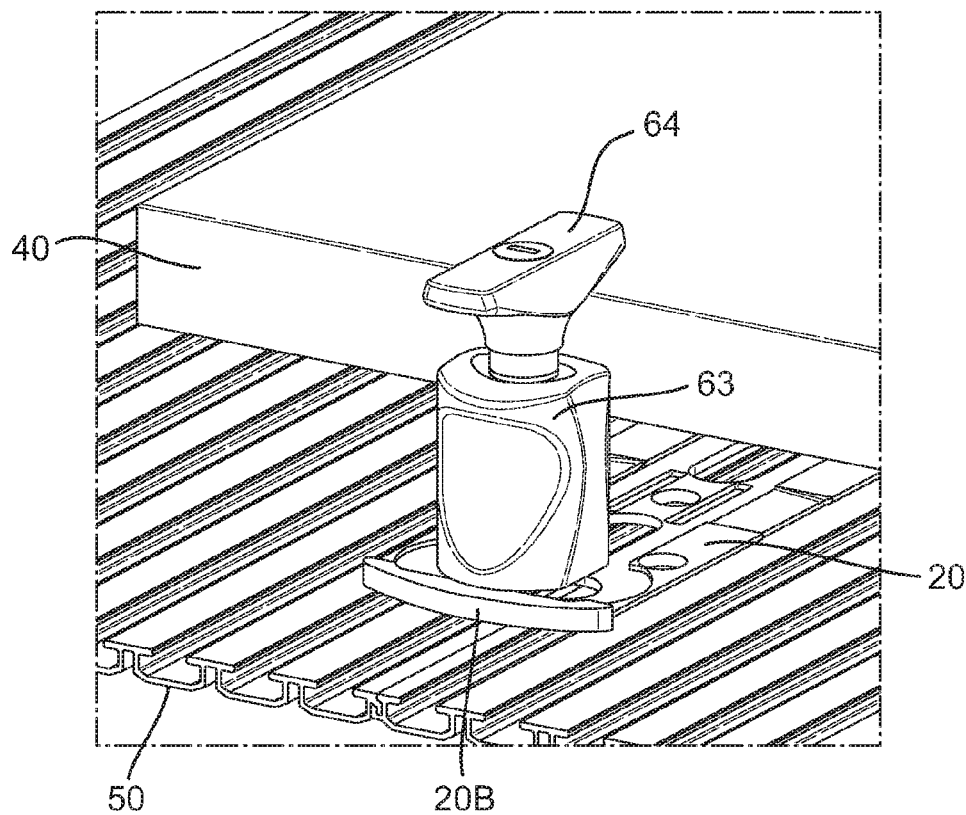
FIGS. 4A to 4D show views of the apparatus corresponding to those of FIGS. 3A to 3D once a securing device of the apparatus has been engaged with the fastening device.
Figure 4B:
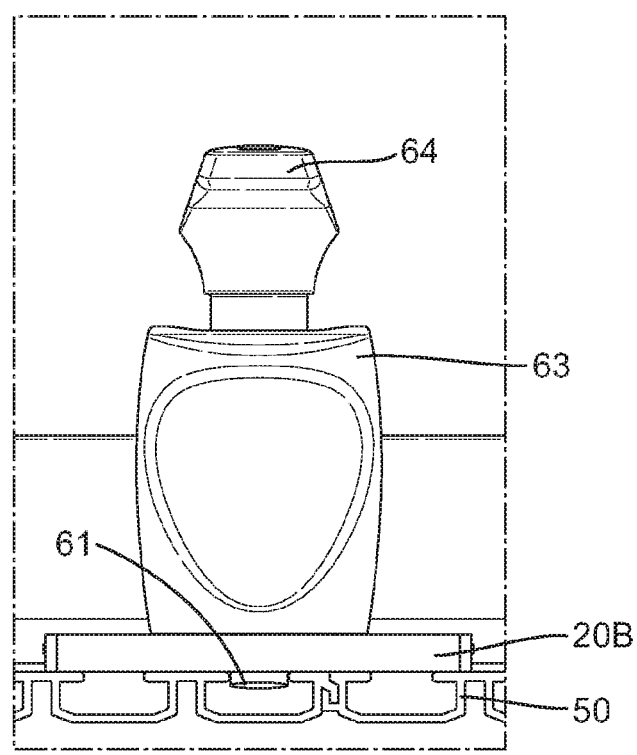
Figure 4C:
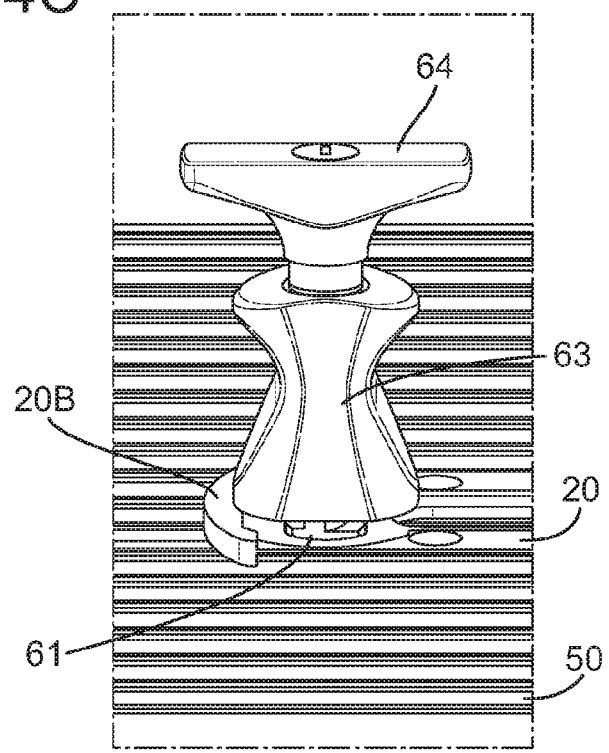
Figure 4D:
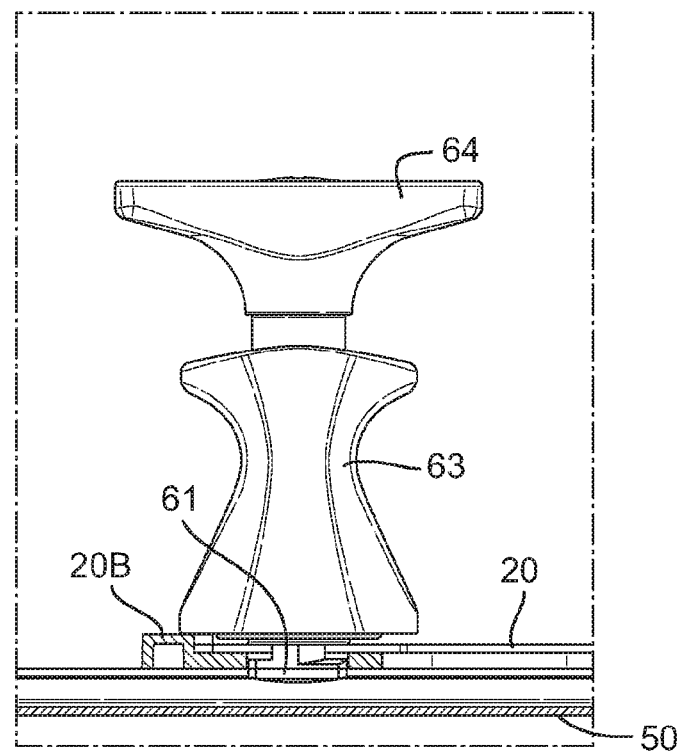
Figure 5A:
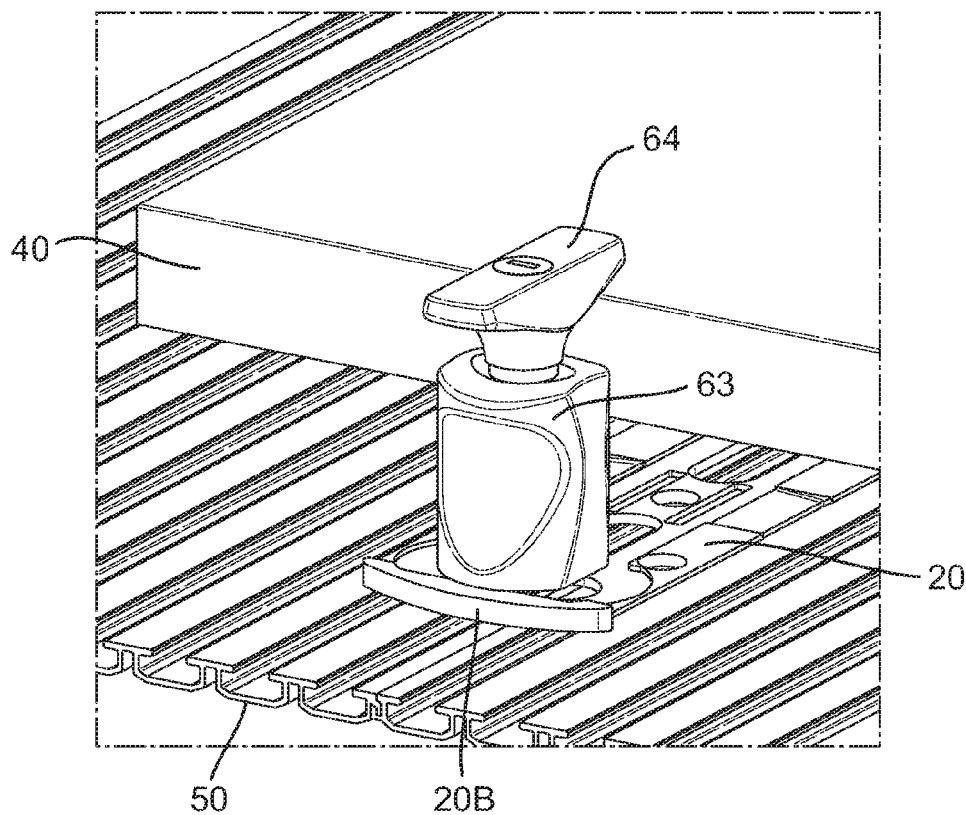
FIGS. 5A to 5D show views of the apparatus corresponding to those of FIGS. 4A to 4D once a handle of the securing device has been pressed downwards as illustrated by an arrow.
Figure 5B:
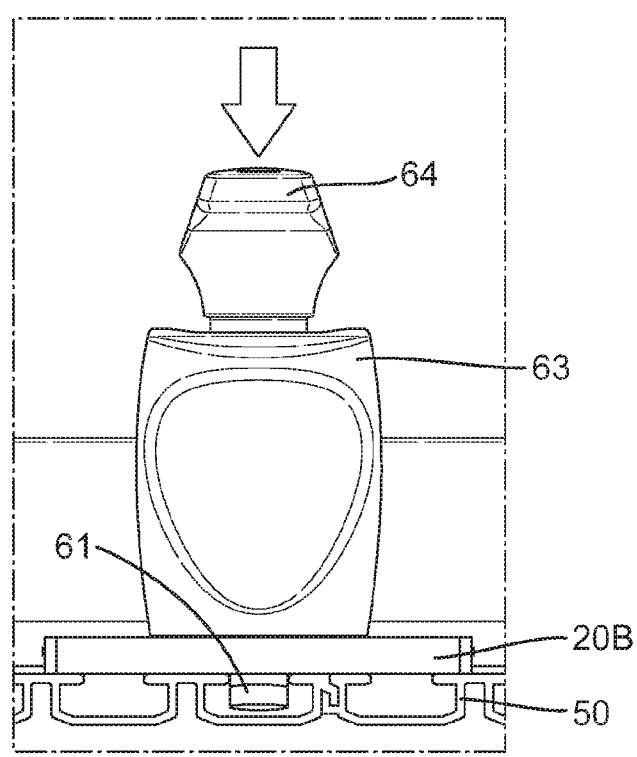
Figure 5C:
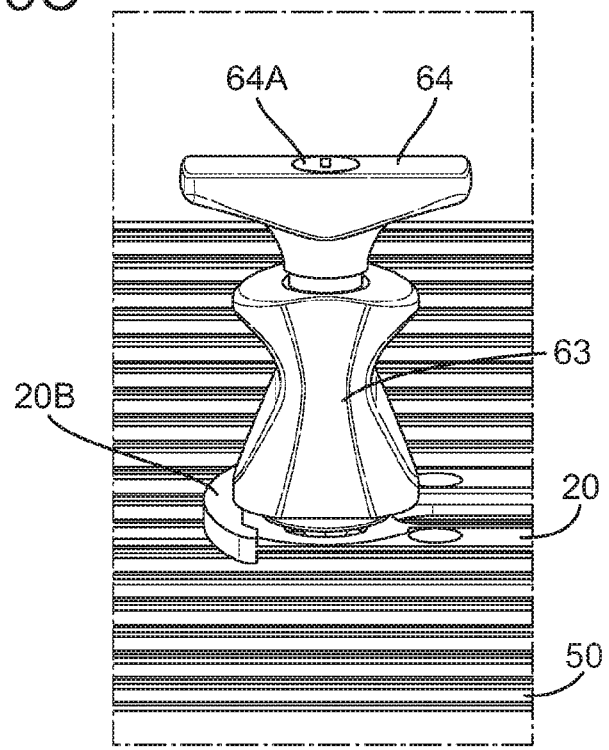
Figure 5D:
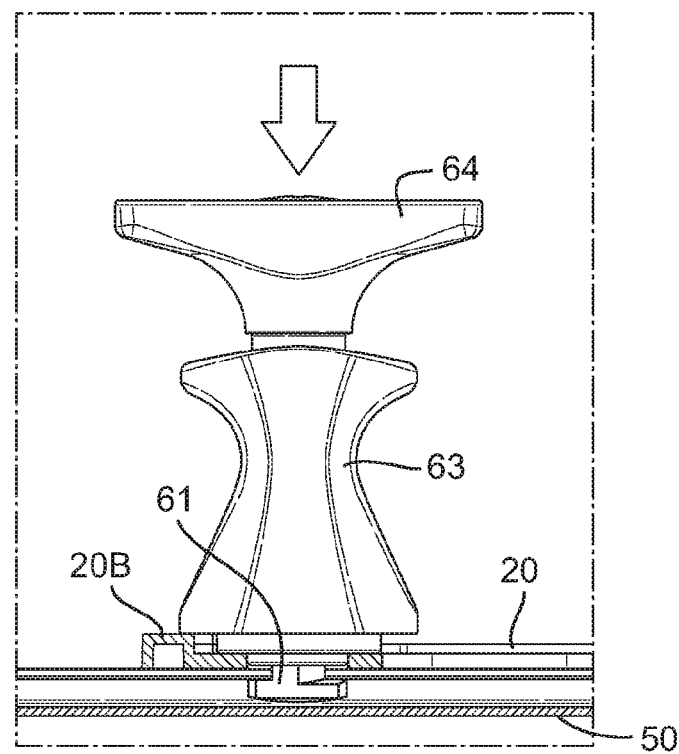
Figure 6A:
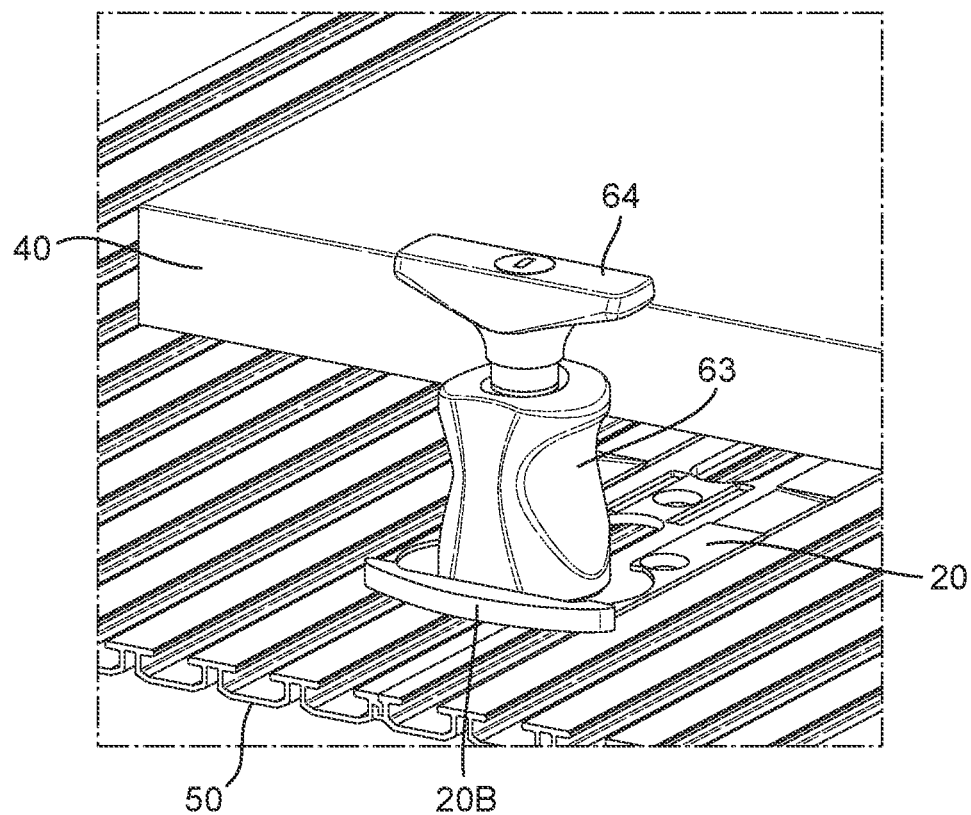
FIGS. 6A to 6D show views of the apparatus corresponding to those of FIGS. 5A to 5D once the handle of the securing device has been rotated as illustrated by an arrow.
Figure 6B:
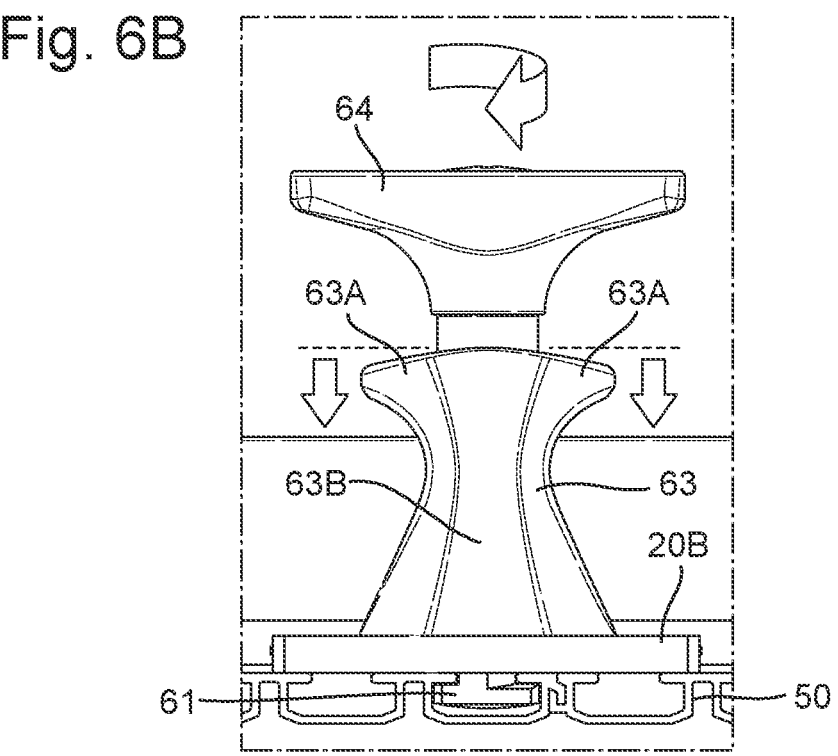
Figure 6C:
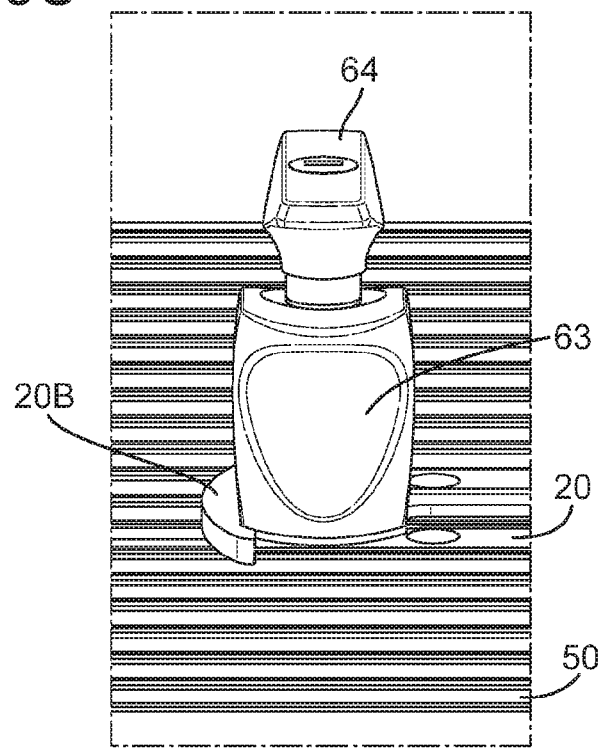
Figure 6D:
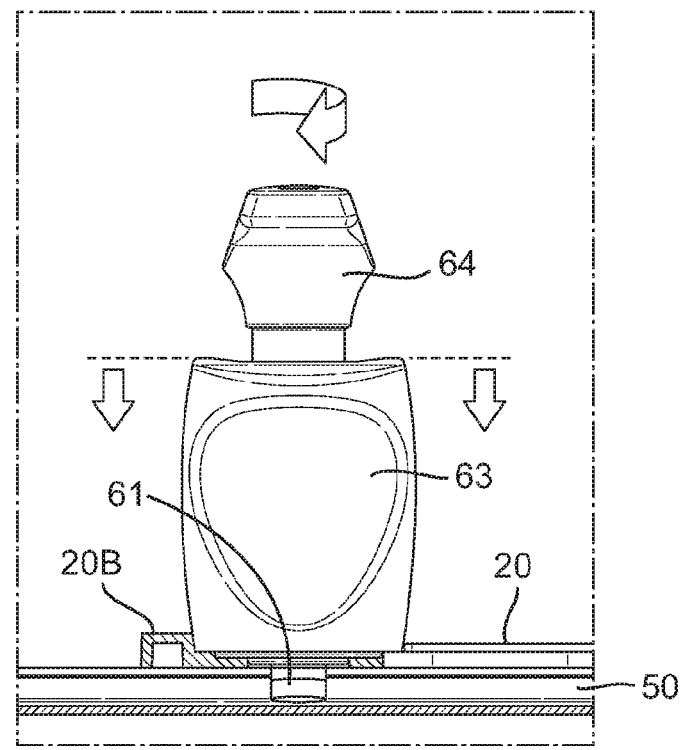

FIGS. 4A and 4B show the securing device 60 once it has been moved into engagement with the second component 20 of the fastening device. In the position shown, the engagement part 63 engages a surface of the abutment 20B and the T-bar 61 passes through (at least partially) the second aperture 20D and (at least partially) extends into a slot 51 in the mounting panel 50. It will be appreciated that to permit this, the second aperture 20D has to be large enough to receive the T-bar 61, at least when in the orientation shown, i.e., when substantially parallel to the length of the second component 20. Similarly, the slot 51 in the mounting panel 50 needs to be wide enough to receive the T-bar 61 in this orientation.

To secure the fastening device so that it secures the artwork to the mounting panel 50, the handle 64 is then pushed downwards, as illustrated by an arrow in FIG. 5, towards the fastening device so the T-bar 61 is moved further downwards into the slot 51 to a position in which an upper surface 61A of the T-bar (in the orientation shown) is at a slightly lower level than that defined by the undersides of the flanges 51A, 51B at the sides of the slot 51.

As illustrated by an arrow in FIG. 6, the handle 64 is then rotated through 90 degrees clockwise which in turn rotates the T-bar 61 through 90 degrees so that the arms of the T-bar are located beneath the flanges 51A, 51B at the side so of the slot 51. As mentioned above, the engagement part 63 rotates with the handle 64 so it also rotated through 90 degrees. This rotation of the engagement part 63 rotates it to a position in which it is able to move axially (under the action of the spring 65) so it moves downwards into the fourth recess 20M as shown in FIG. 6. It will be appreciated that this is due to the non-circular shape of the engagement part 63 which, as it rotates, no longer rests on a surface of the abutment 20B but is able to drop down into the fourth recess 20M.

In this position, the securing device 60 secures the fastening device (and hence the artwork) to the mounting panel 50.

In order to release the securing device 60 it needs to be turned 90 degrees anti-clockwise so that the T-bar 61 disengages from the undersides of the flanges 51A, 51B and can be withdrawn through the slot 51. However, a side face 63B the non-circular perimeter of the engagement part 63 engages the end wall 20R of the abutment and prevents the engagement part 63 from being rotated. Thus, before the securing device 60 can be released, the engagement part 63 has to be moved vertically to disengage it from the end wall 20R. The engagement part 63 is shaped to have two wings 63A at its upper end which can be engaged by a user's fingers as the user holds the handle 64 so the user can lift the engagement part 63 (against the action of the spring 65) so it disengages from the fourth recess 20M and can be rotated anti-clockwise through 90 degrees back to the position shown in FIG. 5 so that the T-bar 61 can be withdrawn from the slot 51 and the securing device 60 can be lifted away from the fastening device.

Figure 7A:
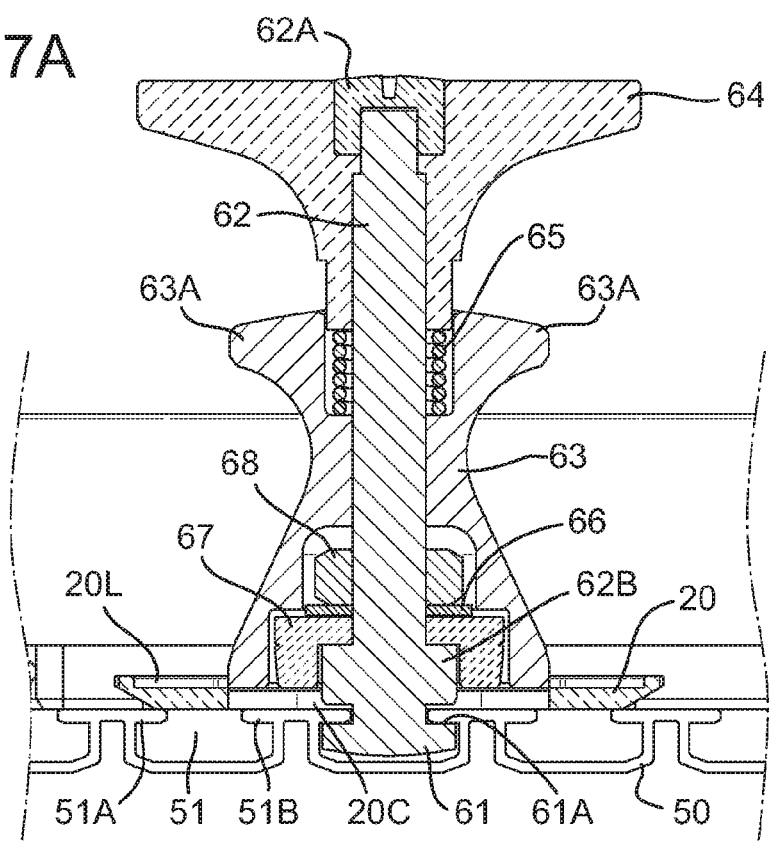
FIGS. 7A and 7B are cross-sectional views through the apparatus in the position shown in FIG. 6 taken on two perpendicular planes.
Figure 7B:
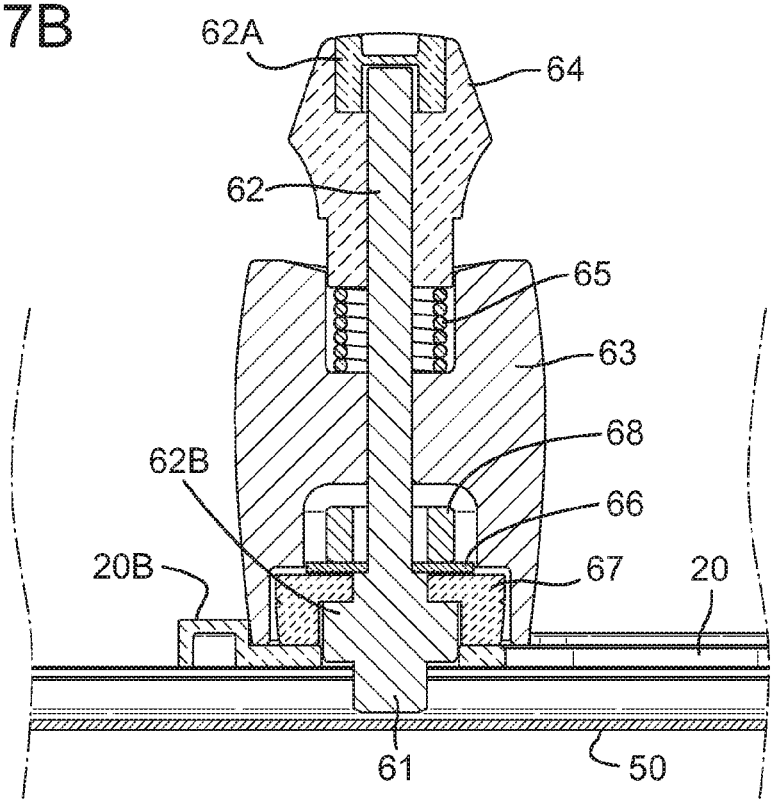

FIGS. 7A and 7B are cross-sectional views through the securing device, second component 20 and the mounting panel 50 when in the secured position shown in FIG. 6; FIG. 7A being taken on a plane perpendicular to the length of the slots 51; and FIG. 7B on a plane parallel to the length of the slots 51. FIGS. 7A and 7B show the handle 64, the engagement part 63 and its wings 63A, the spring 65, the shaft 62 and the locking part 61 described above. In addition, FIGS. 7A and 7B shows that the shaft has a widened portion 62B above but spaced from the locking part 61 at the distal end thereof, a washer 66 and a rubber collar 67 mounted on the shaft 62 and a nut 68. The rubber collar 67 is held in place against the widened portion 62B of the shaft by the nut 68 and washer. As shown in FIGS. 7A and 7B, the components of the securing device 60 are held together by the shaft 62 and nut 62A threaded onto the upper end of the shaft 62. The shaft 62 has a non-circular cross-section (see FIG. 8) and fits through correspondingly shaped through holes in the handle 64 and engagement part 63 so that when the handle 64 is rotated the shaft 62 and the engagement part 63 rotate with it. The engagement part 63 is however axially movable on the shaft 62 and is urged towards the downward position by the spring 65.

As shown in FIGS. 7A and 7B, the widened portion 62B of the shaft 62 is located within aperture 20C in the locked position and the underside of the rubber block 67 engages the surface of the second component about the aperture 20C.

FIG. 7A shows a cross-section through the mounting panel 50 and shows the slots 51 therein, and the flanges 51A and 51B at the sides of the slot 51.

FIGS. 8A and 8B are exploded perspective views of the securing device 60, FIG. 8A being from above and FIG. 8B being from below the securing device, and shows the components described above in relation to FIGS. 6A to 6D.

As described in relation to FIGS. 1A-1D and 2, the first and second apertures 20C, 20D are elongated in a direction at an angle to the direction of sliding of the second component 20, for example in a direction perpendicular thereto. The elongated nature of these apertures 20C, 20D thus makes it easier to ensure that the aperture 20C lies over a slot 51 in the mounting panel 50. Two fastening devices will typically be secured to one side of the frame 40 of an artwork and the provision of elongate apertures 20C means that it is not necessary for these to be spaced apart by an exact multiple of the spacing of the slots 51 of the mounting panel 50 in order to ensure that the apertures 20D of both fastening devices lie over a slot in the mounting panel 50.

In a typical case, four fastening devices will be secured to the frame 40 of an artwork, two on each of two opposite sides of the frame 40 and the frame 40 will be mounted on the mounting panel 50 so that second components 20 of each of the fastening devices lie parallel to the length of the slots 51 in the mounting panel 50 (as shown in FIGS. 3A to 6D). However, in some cases, it may be desired to secure one or more fastening devices to the other sides of the frame 40 so that the second components 20 of these devices lie perpendicular to the length of the slots 51 in the mounting panel 50. It is for his reason that the third and fourth elongated apertures 20E, 20F are provided in the second component 20. As these are elongated in a direction parallel to the length of the second component 20, they help ensure that the apertures 20E or 20F lie over a slot 51 in the mounting panel 50 so that the fastening device can be secured thereto by a securing device 60 in the manner described above in relation to FIGS. 3A to 6D.

In the arrangement shown, the first and second apertures 20C, 20D are located toward the respective ends of the second component 20 and the third and fourth apertures 20E, 20F are located between these and the mid-point of the second component 20. However, the apertures may be arranged in other ways, e.g., in a reverse arrangement in which the third and fourth apertures (which are elongated in the direction of the length of the second component 20) lie toward the ends of the second component 20 and the first and second apertures (which are elongated in a direction at an angle to the length of the second component 20) lie between these and the midpoint of the second component 20.

In addition to the first and second apertures 20C, 20D and third and fourth apertures 20E, 20F, the second component 20 may also be provided with screw holes 20G so the second component 20 can be secured to a mounting panel 50 by way of screws or other screw thread fasteners. This is an optional method of fixing which may be used in addition to or in place of the securing devices 60 described above.

As shown in the drawings, the dimensions of the screw holes 20G are typically significantly smaller than the dimensions of the apertures 20C, 20D, 20E, 20F provided for receiving the locking part 61 of the securing device 60. Screw holes 20G will typically have a diameter of around 4-8 mm whereas the first and second apertures 20C, 20D (and the third and fourth apertures 20E, 20F) may typically have a width (in the shorter direction) in the range 10-20 mm, and optionally around 15 mm, and a length (in the longer dimension) in the range 25-45 mm, and optionally around 35 mm. Such dimensions enable the first and second apertures to be aligned with slots which typically have a pitch in the range 15-25 mm (and optionally around 20 mm) without the need for precise location of the fastening devices on the artwork as described above.

As mentioned above, the second component 20 may be symmetrical about is center line so that it does not matter which way round it is assembled with the first component 10. However, other arrangements can be envisaged, in particular arrangements in which the layout of holes, apertures and/or recesses therein is not symmetrical.

As described above, in the arrangement, the retention members on the mounting panel 50 are provided by slots therein (and flanges defining the sides of the slot). In such an arrangement, the mounting panel may comprise a series of flanges coplanar with a face of the panel 50 separated by a series of parallel slots. However, other forms of retention members can be envisaged.

The slots may, for example, not be continuous but may be interrupted, e.g., to form a lines of shorter slots. An array of other shaped slots or apertures may also be provided across the mounting panel. In a further arrangement, the retention members may comprise members fastened to the surface of the mounting panel each of which is shaped to engage with the T-bar 61 (or other form of locking part) of the securing device 60. It should also be appreciated that the retention members may not be provided across all areas of the mounting panel. In an arrangement, one or more retention members may be attached to a mounting panel only at locations in which the securing device will be located for a particular artwork.

The T-bar may comprise two projecting arms but other forms of locking part arranged to engage and disengage from a respective retaining part can be envisaged.

Other arrangements for enabling the engagement part of the securing device to move axially relative to the locking part can be envisaged. The engagement part may comprise a resiliently compressible member (such as a spring or a rubber component) compression of which in the axial direction provides said axial movement. In an arrangement (such as that described in relation to FIGS. 3A to 8B), a compressing force is required to be applied to the securing device in the axial direction to compress said compressible member in order to move the locking part axially so that it is able to engage with a retention member.

In such arrangements, it is necessary to move the engagement means axially so it is no longer inhibited from being rotated by its engagement with the fastening device in order to permit rotation of the locking part to release it from the retention member.

The retention member may also be shaped so that when the locking part is fully engaged therewith, the locking part is able to move to some extent in a second axial direction (opposite to the first axial direction) upon release of said compressing force in the first axial direction. The retention member thus inhibits rotation of the locking part in a counter-clockwise direction until the locking part is pressed downwards slightly. This provides an alternative, or additional, means for preventing inadvertent release of the locking part from the retention member.

Parts of the securing device 60, such as the handle 64 and engagement part 63, may be formed of a plastics material, for example polyoxymethylene POM (which is tough and has low friction properties). Other parts of the securing device, e.g., the bolt 64A and the locking part 61, may be made of metal, e.g., steel.

The apparatus described above, comprising a plurality of securing devices 60 and a mounting panel 50 may be supplied alone or may be supplied in combination with a plurality of fastening devices such as those described in relation to FIGS. 1A-1D and 2. Other forms of fastening devices may be used which can be secured to the frame of an artwork and which have an aperture in a part which protrudes from a side of the frame through which the locking part of the securing device can be inserted.

Figure 9:
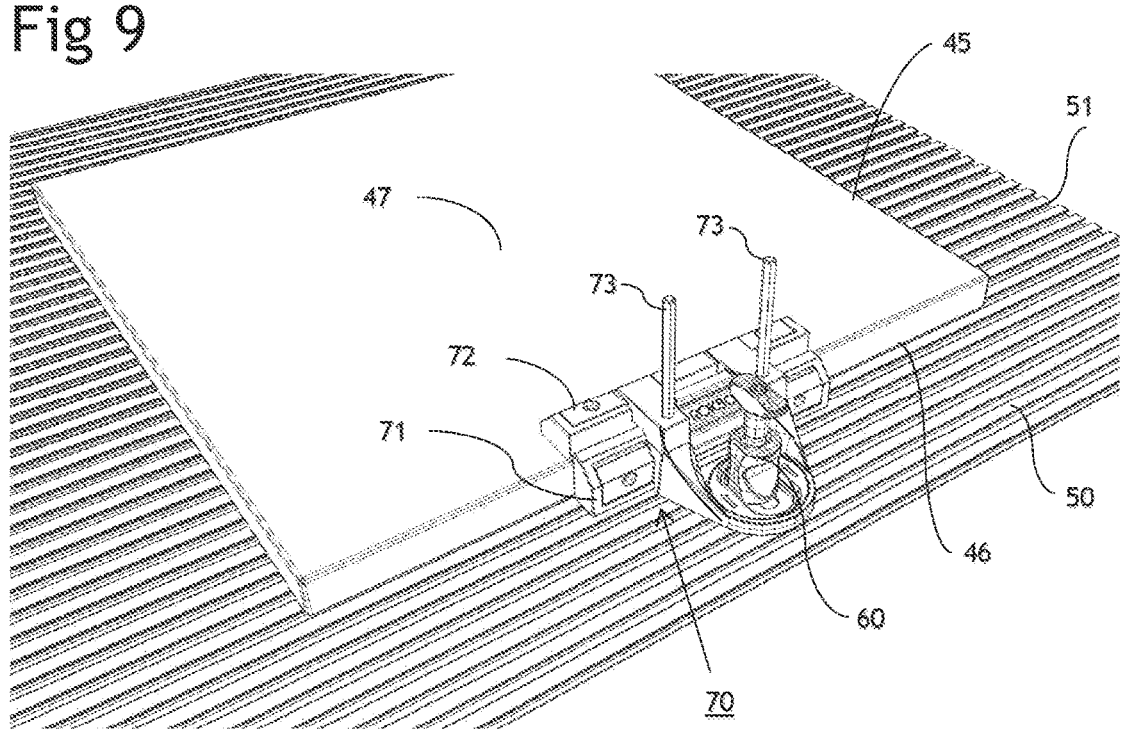
FIG. 9 schematically depicts an arrangement of an apparatus for securing artwork.
Figure 10:
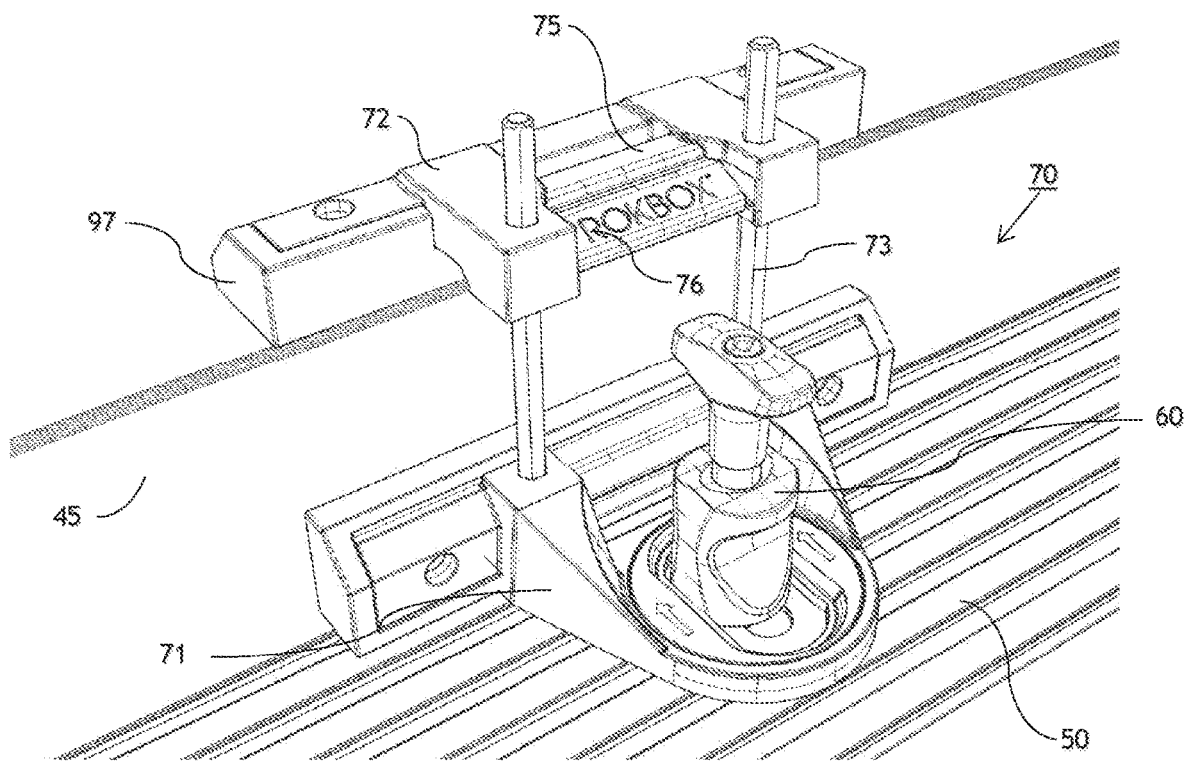
FIG. 10 depicts a close-up of the arrangement depicted in FIG. 9 in a different state of operation.

The arrangements discussed above utilize one or more fastening devices secured to the frame of an artwork. FIGS. 9 and 10 depict a further arrangement for holding artwork that may be used instead of, or in addition to, the arrangements discussed above.

The arrangement depicted in FIGS. 9 and 10 is configured to support an artwork 45 on a mounting panel 50 such as that discussed above, including the variations of the mounting panel 50 discussed above, and may be incorporated within a container for holding artwork during transportation or storage in the same manner as discussed above.

In order to secure the artwork 45, one or more clamps 70 are provided. Each of the clamps 70 is configured to be movable between an unengaged state in which artwork 45 can be provided to, or removed from the apparatus, and an engaged state, in which the clamp 70 secures the artwork 45 to the apparatus. It should be appreciated that the artwork 45 may be secured by the clamps without further packaging. Alternatively, the artwork may be encased in suitable packaging first such that the clamps 70 secure a package of artwork 45. It should also be appreciated that such a package may include more than one artwork. Alternatively or additionally, multiple separate packages of artwork may be secured to the mounting panel 50 by the one or more clamps 70.

It should be appreciated that by using this arrangement, there may be flexibility in the size and shape of the artwork that can be secured to the mounting panel 50. Furthermore, the system may be independent of any fastening devices attached to, for example, the frames of the artwork. This may be beneficial when suitable fastening devices are not already attached to the artwork because it may be undesirable to add or replace a fastening, for example because it may be difficult to obtain permission to do so.

Each clamp comprises a base 71 and a gripping section 72 that may be moved relative to the base 71, as discussed further below. In the engaged state of the clamp 70, when the clamp 70 is securing the artwork to the apparatus, the artwork 45 is clamped between the support surface of the mounting panel 50 and the gripping section 72 of the clamp 70. In particular, while a first side 46 of the artwork 45 is supported on the mounting panel 50, the gripping section 72 of the clamp 70 presses on a second side 47 of the artwork 45, which is on the opposite side of the artwork 45 to the first side 46. For convenience, these may be referred to below as the bottom side 46 and the top side 47 of the artwork 45, based on the orientation of the artwork while it is being secured to the mounting panel 50, but it will be appreciated that the actual orientation of the artwork 45 may change, for example once the artwork is secured in the apparatus.

The one or more clamps 70 are configured such that the gripping section 72 can be advanced towards or retracted away from the base 71 of the clamp 70. This may enable both the movement of the clamp 70 between the engaged state and the unengaged state and also enable the clamp 70 to secure different sizes of artwork 45. For example, in the arrangement depicted in FIG. 9, the clamp 70 is securing a relatively thin artwork 45 whereas in the arrangement depicted in FIG. 10, the clamp 70 is securing a relatively thick artwork 45. In an arrangement, the clamp 70 may be configured such that the distance between the base 71 of the clamp 70 and the gripping section 72 is infinitely adjustable within the range of movement that the clamp 70 is configured to provide.

In an arrangement, as shown in FIGS. 9 and 10, each clamp 70 may comprise a pair of rods 73 that extend from the base 71 of the clamp 70 in a direction substantially perpendicular to the surface of the mounting panel 50. The gripping section 72 may be configured to slide along the rods 73 to provide the require adjustment in the separation between the base 71 of the clamp 70 and the gripping section 72, as discussed above.

Implementing the clamp 70 utilizing two rods 73 between the base 71 of the clamp 70 and the gripping section 72 may beneficially provide a good compromise between benefits of simplifying the clamp 70 and minimizing the number of parts on the one hand and providing adequate strength and stability for the clamp 70 on the other hand. It should be appreciated, however, that a clamp 70 based on the design depicted in FIGS. 9 and 10 may have any number of rods 73. It should also be appreciated that, although the rods 73 depicted in FIGS. 9 and 10 have a hexagonal cross-section, this is not essential and the rods 73 may, in general, have any cross-section.

In an arrangement, the clamp 70 further includes a lock mechanism 75 that is configured to control the movement of the gripping section 72 relative to the base 71 of the clamp 70. The lock mechanism 75 may be configured such that, when it is engaged, it fixes the position of the gripping section 72 relative to the rods 73, thereby fixing the position of the gripping section 72 relative to the base 71 of the clamp 70, for example when the clamp 70 is in the engaged state.

As discussed further below, the lock mechanism 75 may be configured such that, when it is engaged, the gripping section 72 can be advanced closer to the base 71 of the clamp but cannot be moved further away from the base 71 of the clamp 70. Such an arrangement may enable a user to push down the gripping section 72 onto the artwork 45 being secured by the clamp 70 until a desired clamping force is obtained, at which point the gripping section 72 will remain locked in place rather than moving away from the base 71 of the clamp 70 when the user releases the pressure.

The lock mechanism 75 may include a release 76 that, when operated by a user, disengages the lock mechanism 75, enabling the gripping section 72 to be moved further away from the base 71 of the clamp 70.

Figure 11:
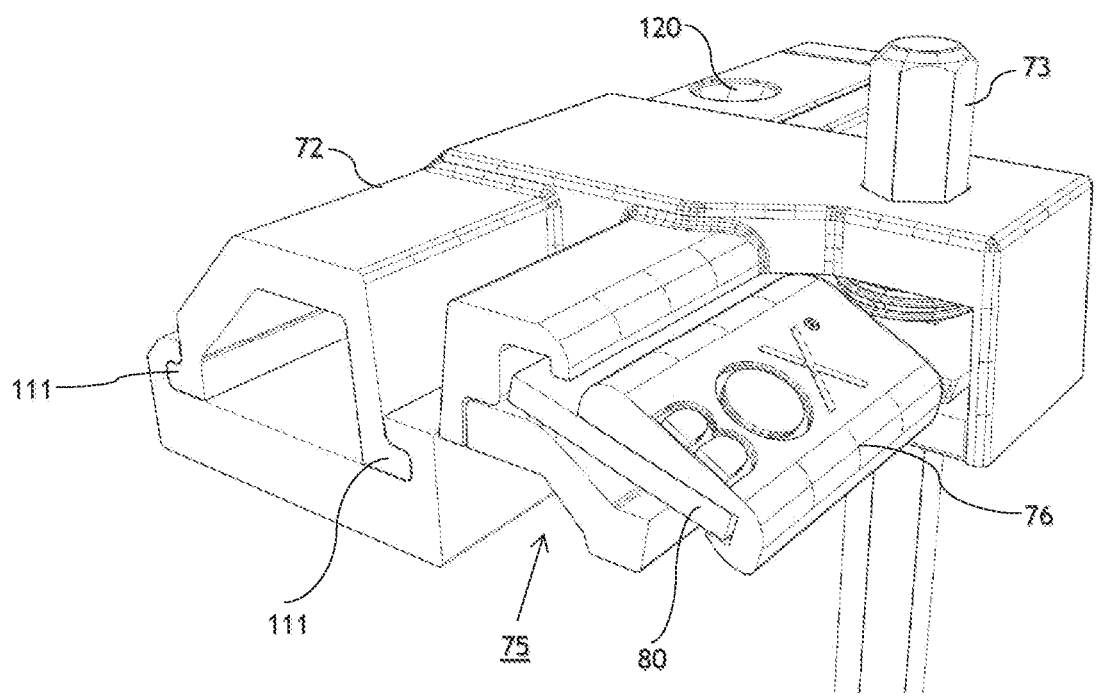
FIG. 11 depicts a cut-away section of part of the apparatus depicted in FIGS. 9 and 10.
Figure 12:
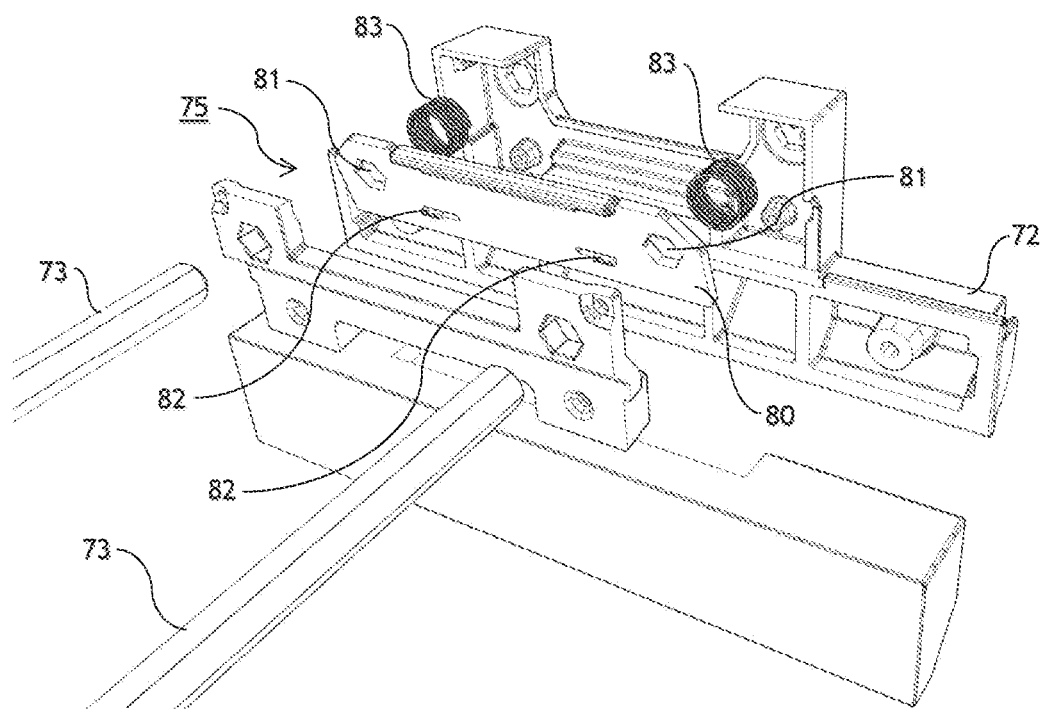
FIG. 12 depicts an exploded diagram of part of the apparatus depicted in FIGS. 9 and 10.

FIGS. 11 and 12 depict an arrangement of a lock mechanism 75. It will be appreciated that alternative arrangements of a lock mechanism may be used. As shown in FIGS. 11 and 12, the lock mechanism 75 comprises a locking plate 80 having apertures 81 arrange such that a rod 73 of the clamp 70 passes through each of the apertures 81. The locking plate 80 is mounted to the gripping section 72 by pivots 82 such that the locking plate 80 can be moved between positions at different angles to the elongate direction of the rods 73.

The locking plate 80 is configured such that in one angular position, the rods 73 can pass easily through the apertures 81 but, in a second angular position, the edges of the apertures 81 engage with and grip a rod 73 passing through each aperture 81. In an arrangement such as that depicted in FIGS. 11 and 12, opposite edges of each aperture 81 grip respective opposite sides of each rod 73. This may ensure a strong locking action while avoiding the need for a mechanism based on ratchets and/or tooth engagements and therefore provides infinite adjustability within the available range of movement.

As shown in FIGS. 11 and 12, the locking mechanism 75 may include springs 83, or other resilient members, that bias the locking plate 80 to the angular position in which the edges of the apertures 81 grip the rods 73. Such an arrangement may be convenient because the locking mechanism 75 may be used to maintain a separation between the base 71 of the clamp 70 and the gripping section 72 after a user has moved the clamp 70 to the unengaged state in preparation for providing an artwork 45 to the apparatus, for example when the gripping section 72 is at a maximum distance from the base 71 of the clamp 70.

Alternatively or additionally, as is the case for the arrangement depicted in FIGS. 11 and 12, the lock mechanism 75 may be configured such that exerting a force on the gripping section 72 of the clamp 70 towards the base 71 of the clamp 70 tends to disengage the edges of the aperture 81 from a rod 73 passing through it but a force on the gripping section 72 of the clamp 70 in a direction away from the base 71 of the clamp 70 forces the edges of the aperture 81 to grip a rod 73 passing through the aperture. Accordingly, the locking plate 80 is configured such that the gripping section 72 can be pushed down towards the base 71 of the clamp 70 in order to engage the gripping section 72 with the top surface 47 of an artwork 45 but, once the gripping section 72 is pressing down on artwork 45 secured by the clamp 70, the reaction force of the artwork 45 against the gripping section 72 has the effect of engaging the lock mechanism 75 more tightly, ensuring that the artwork 45 is securely held.

In order to release the lock mechanism 75 depicted in FIGS. 11 and 12, a user merely needs to rotate the locking plate 80 about the pivots 82 in order to disengage the edges of the openings 81 from the rods 73. In the arrangement depicted, the release 76 is provided by a pad mounted to the locking plate 80 which may improve user comfort. However, in other arrangements, the release may be an exposed edge of the locking plate 80.

As depicted in FIGS. 9 and 10, the base 71 of the clamp 70 may be secured to the mounting panel 50 using a securing device 60 such as that discussed above, including its variations. For brevity, detailed explanation of the securing device 60 and the manner in which it engages with the mounting panel 50 will not be repeated.

Figure 13:
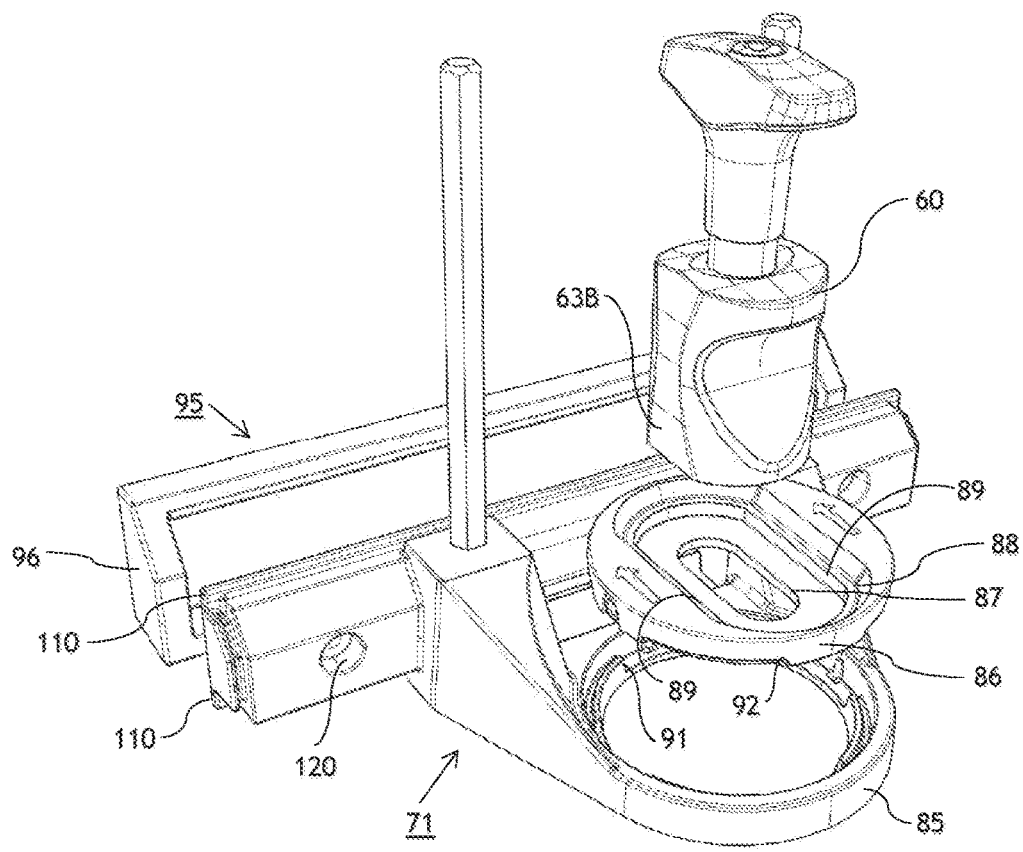
FIG. 13 depicts further detail of part of the apparatus depicted in FIGS. 9 and 10.

As shown in FIG. 13, in an arrangement, the base 71 of the clamp 70 may include a mounting section 85 that is mounted on the mounting panel 50, and an aperture plate 86 that is supported by the mounting section 85. The aperture plate 86 includes an elongate aperture 87 that performs the same function as, for example, the aperture 20C of the fastening device 20 discussed above and a recess 88 that performs a similar function to the fourth recess 20M of the fastening device discussed above, namely engages with the engagement part 63 of the securing device 60 to prevent the engagement part 63 from being rotated once the securing device is engaged with the mounting panel 50 to secure the base 71 of the clamp 70 to the mounting panel. In particular, straight edges 89 of the recess 88 are configured to engage with the side face 63B of the engagement part 63 to preclude rotation. However, the recess 88 is configured such that the securing device 60 can fit within the recess 88 at a range of positions in a direction parallel to the elongate direction of the aperture 87. As with the fastening device discussed above, therefore, although the securing device 60 may only be engaged with the mounting panel 50 in discrete locations, for example in a direction perpendicular to the length of parallel slots 51 within the mounting panel 50, the position of the base 71 of the clamp 70 in that direction may be infinitely adjustable within a range of movement that is sufficient to ensure that the base 71 of the clamp 70 can be secured at any position on the mounting panel 50.

In an arrangement, as shown in FIG. 13, the aperture plate 86 may be configured such that its position relative to the mounting section 85 of the base 71 of the clamp can be adjusted such that the orientation of the elongate direction of the elongate aperture 87 relative to the mounting section 85 can be changed. Such an arrangement may permit the base 71 of the clamp 70 to be used in different orientations relative to the orientation of slots 51 of the mounting panel 50 whilst enabling the elongate direction of the elongate aperture 87 to be perpendicular to the slots 51. This means that a single design of clamp 70 may be provided and used at different orientations relative to the mounting panel 50, simplifying both manufacture and use of the apparatus.

In an arrangement, the mounting section 85 and the aperture plate 86 have respective engagement members 91, 92 that limit the possible orientation of the aperture plate 86 relative to the mounting section 85. In an arrangement, the engagement members 91, 92 may be configured such that the aperture plate 86 can be mounted to the mounting section 85 in first and second orientations in which the respective elongate directions of the elongate aperture 87 are perpendicular to each other. In an arrangement, the clamp 70 may be configured to engage with an edge of the artwork 45. The first and section orientations of the aperture plate 86 relative to the mounting section 85 may be selected such that in one orientation, as depicted in FIG. 13, the elongate direction of the elongate aperture 87 is perpendicular to the edge of any artwork 45 engaged with the clamp 70 and, in the second orientation, the elongate direction of the elongate aperture 87 is parallel to the edge of such artwork 45.

It should be appreciated, however, that it is not essential for the base 71 of the clamp 70 to have a separate aperture plate 86 and mounting section 85. For example, these components may be integrally formed such that the elongate direction of the elongate aperture 87 may have a fixed orientation relative to the remainder of the base 71 of the clamp 70. In such an arrangement, a kit of parts may be provided, including different clamps 70 or different bases 71 of clamp 70 in which the elongate direction of the elongate apertures 87 relative to the remainder of the base 71 of the clamp 70 differ.

It should also be appreciated that, although the above description refers to an arrangement with an elongate aperture 87 within the base 71 of the clamp through which the securing device 60 engages with the mounting panel 50, this is not essential and alternative shapes of aperture may be used.

In an arrangement, the base 71 of the clamp 70 may include an abutment face 95 that is configured to engage with an edge of artwork 45. In an arrangement, the base 71 of the clamp 70 may include a resilient pad 96 that forms the abutment face 95. In use, the base 71 of the clamp 70 may be positioned against the edge of the artwork 45. The resilient pad 96 may deform if the base 71 of the clamp 70 is pushed too hard against the artwork, minimizing the likelihood of damage, and/or the resilient pad 96 may be configured to deform elastically such that the base 71 of the clamp 70 may be pressed against the edge of the artwork 45 in order to provide a desired clamping force against the edge of the artwork 45, albeit that this clamping force may be relatively low.

In an arrangement, for example as shown in FIG. 10, a resilient pad 97 may alternatively or additionally be provided on the surface of the gripping section 72 that engages with the upper surface 47 of the artwork 45. The resilient pad 97 may reduce the likelihood of damage to the artwork 45 by engagement with the clamp 70 and/or may deform elastically in order to provide a desired clamping force between the gripping section 72 of the clamp 70 and the artwork 45.

Figure 14:
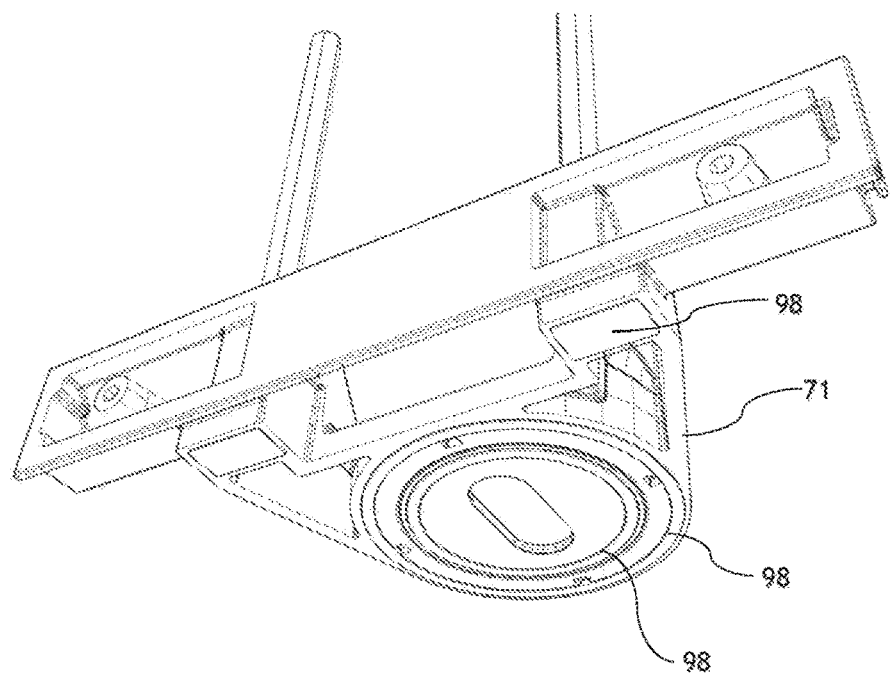
FIG. 14 depicts a view from underneath the apparatus depicted in FIG. 13.

In an arrangement as depicted in FIG. 14, the underside of the base 71 of the clamp 70 may include one or more mounting pads 98, for example formed from a rubber, that sit between the base 71 of the clamp 70 and the upper surface of the mounting panel 50. The mounting pads 98 may be configured to reduce sliding between the base 71 of the clamp 70 and the mounting panel 50 once the base 71 of the clamp 70 has been secured to the mounting panel 50 by a securing device 60. Alternatively or additionally, the mounting pads 98 may be resilient and configured to deform elastically to provide a desired reaction force between the clamp 71 and the mounting panel 50 when the base 71 of the clamp 70 is secured to the mounting panel 50 by a securing device 60.

Figure 15:
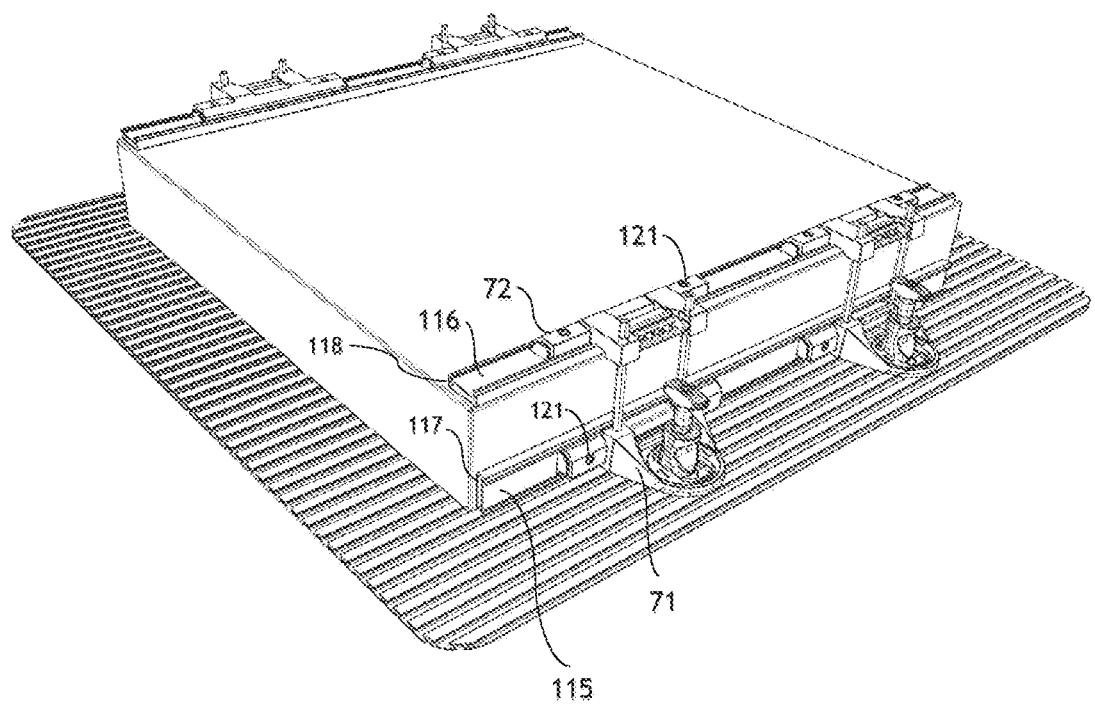
FIG. 15 depicts a further arrangement for securing artwork to an apparatus.

In an arrangement, as shown in FIG. 15, one or both of the abutment face 95 of the base 71 of the clamp 70 and the gripping section 72 of the clamp 70 may be configured such that a length of an extrusion 115, 116 can be attached to them, for example in place of the resilient pads 96, 97. For example, as shown in FIGS. 11 and 13, the base 71 of the clamp 70 and the gripping section 72 of the clamp 70 may have flanges 110, 111 that can either engage with recesses within the resilient pads 96, 97 or can engage with recesses 117, 118 within an extrusion 115, 116.

Such an extrusion 115, 116 may have a constant cross-section along its length and can therefore be cut to any required length. The use of an extrusion 115, 116 may spread the forces acting between the artwork 45 and the surfaces of the clamp 70 facing the artwork 45 over a greater area than is provided using the clamp alone. This may reduce the pressure exerted on the artwork. An extrusion 115, 116 may be used for any one or more points of contact with the artwork 45. For example during transport or storage, the artwork 45 may predominantly be supported on one edge. In that case, an extrusion 115 may be used between a clamp 70 supporting that edge of the artwork 45 and the edge of the artwork 45.

In an arrangement, the base 71 of the clamp 70 and/or the gripping section 72 may include holes 120 that may be configured to receive fixings 121, such as screws or bolts. The fixings 121 may be used to secure the extrusions 115, 116 to the base 71 of the clamp 70 and/or the gripping section 72, respectively, namely prevent them from sliding relative to each other. Optionally, the holes 120 could be used for fixings to secure to the base 71 of the clamp 70 and/or the gripping section 72 a load spreader that, for example is not specifically configured to engage with the base 71 of the clamp 70 and/or the gripping section 72. For example, a user could use a fixing through the holes 120 to secure a wooden batten.

In an arrangement, artwork 45 may be secured to the mounting panel 50 by one or more pairs of clamps 70 provided on opposite edges of the artwork 45. For example, for rectangular or square artwork, the artwork 45 may be secured by two pairs of clamps 70 such that a clamp is provided on each of the four edges of the artwork 45. In an arrangement, two pairs of clamps 70 may be provided for the long edges of a rectangular artwork 45 and a single pair of clamps 70 may be provided for the short side. The use of multiple clamps 70 along one edge of the artwork 45 may be used to spread the forces exerted on the artwork 45. It should be appreciated that, if desired, in addition to providing multiple clamps 70 along one edge of an artwork 45, one or more of the clamps 70 may be provided with an extrusion 115, 116, as described above to further spread the loading. In an arrangement as depicted in FIG. 15, multiple clamps 70 may be connected to a common extrusion 115, 116. In an arrangement, an extrusion 115, 116 may be provided to a single clamp 70. It will be appreciated that other arrangements are possible.

Figure 16:
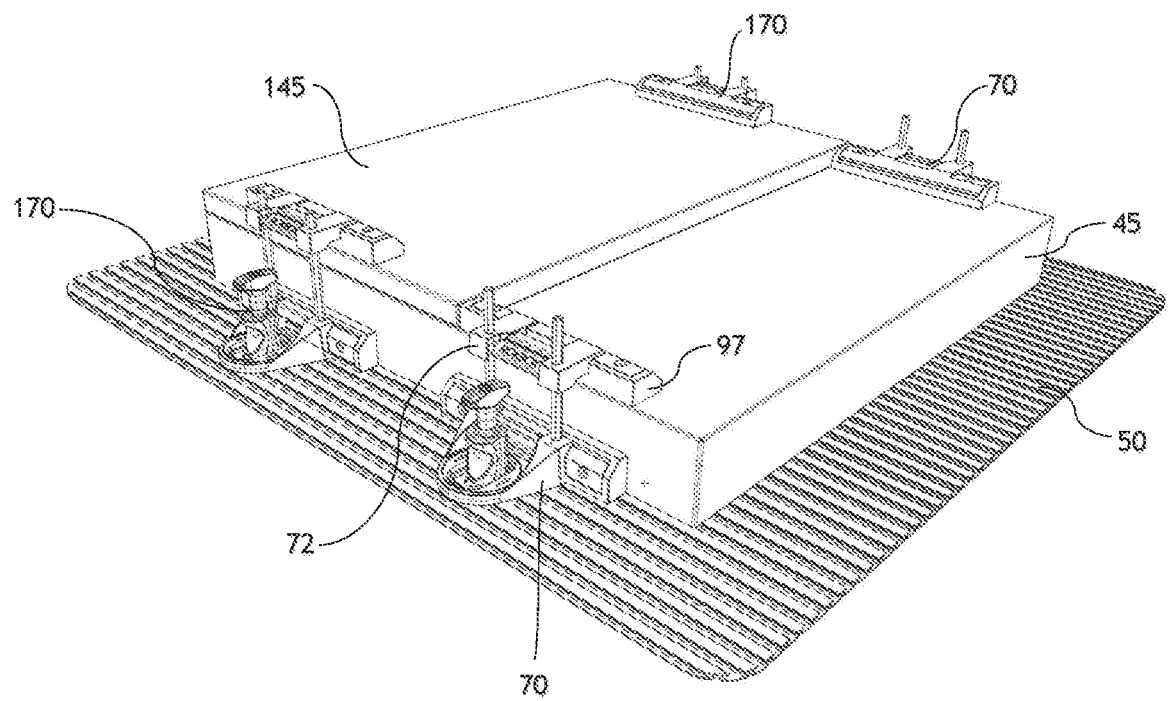
FIG. 16 illustrates an optional use of the apparatus of the present disclosure.

FIG. 16 illustrates a use of the apparatus in which a first artwork 45, or package of artwork, is secured to a mounting panel 50 using two clamps 70, 170 on each of two opposite sides of the first artwork 45. As further depicted, and as discussed above, a second artwork 145, or package of artwork, may be positioned on top of the first artwork 45 and also secured to the mounting panel 50. As illustrated the two artworks 45, 145 need not be the same size. In such an arrangement, although the first artwork 45 is secured by both clamps 70, 170 on each of the two sides, the second artwork 145, which is smaller, may be only secured by one of the clamps 170 on each side.

As shown, in such an arrangement, the two clamps 70 only securing the first artwork 45 may be positioned such that edges of their respective gripping sections 72 abut the edge 48 of the second artwork 145. This may assist in securing the position of the second artwork 145. In an arrangement, the edges of the gripping section 72 and/or its resilient pad 97 may be designed to be perpendicular to the length of the gripping section 72. This may facilitate its use in assisting securing the second artwork 145.

Figure 17:
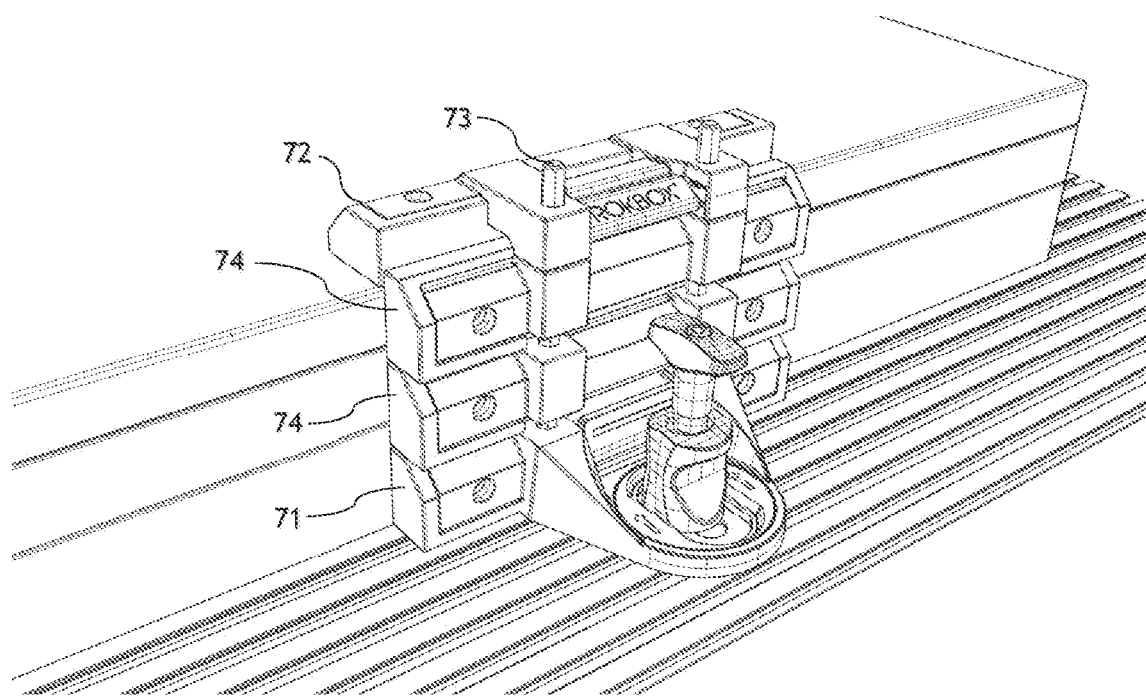
FIG. 17 depicts a variation of the apparatus of the present disclosure.

In an arrangement, a clamp 70 may include one or more spacers 74, provided between the base 71 of the clamp 70 and the gripping section 72. As shown in FIG. 17, the spacers 74 may be mounted to the rods 73 in the same manner as the gripping section 72. As shown in the example depicted in FIG. 17, the spacers 74 may not include a lock mechanism. However, in an arrangement, at least one spacer 74 may have a lock mechanism similar to that described above with respect to the gripping section 72. The spacers 74 may have an abutment face similar to the abutment face 95 of the base 71 of the clamp 70. In a similar manner to the abutment face 95 of the base 71 of the clamp 70, the abutment face of the spacers 74 may be configured to connect to a resilient pad or an extrusion to function as a load spreader and may have holes to secure an extrusion or other load spreader.

Figure 18:
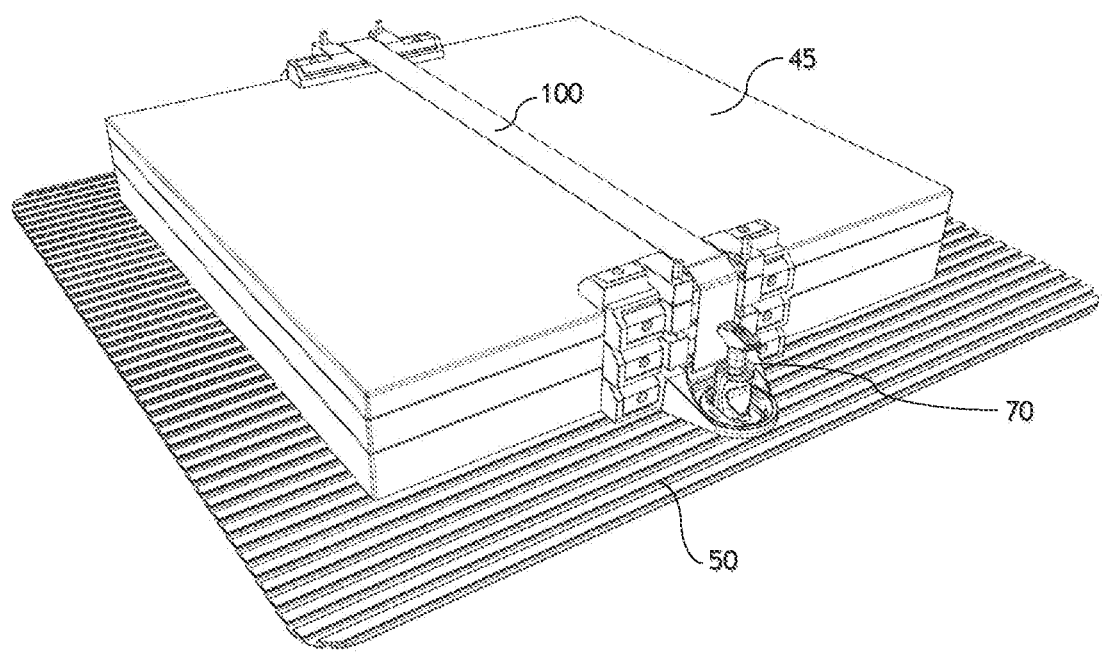
FIG. 18 depicts an arrangement of the apparatus including a strap.

In an arrangement, as depicted in FIG. 18, a strap 100 may be provided between a pair of clamps 70. In such an arrangement, the strap may be secured to base 71 of the clamps 70. The strap 100 may assist in securing the artwork 45 to the mounting panel 50.

Figure 19:
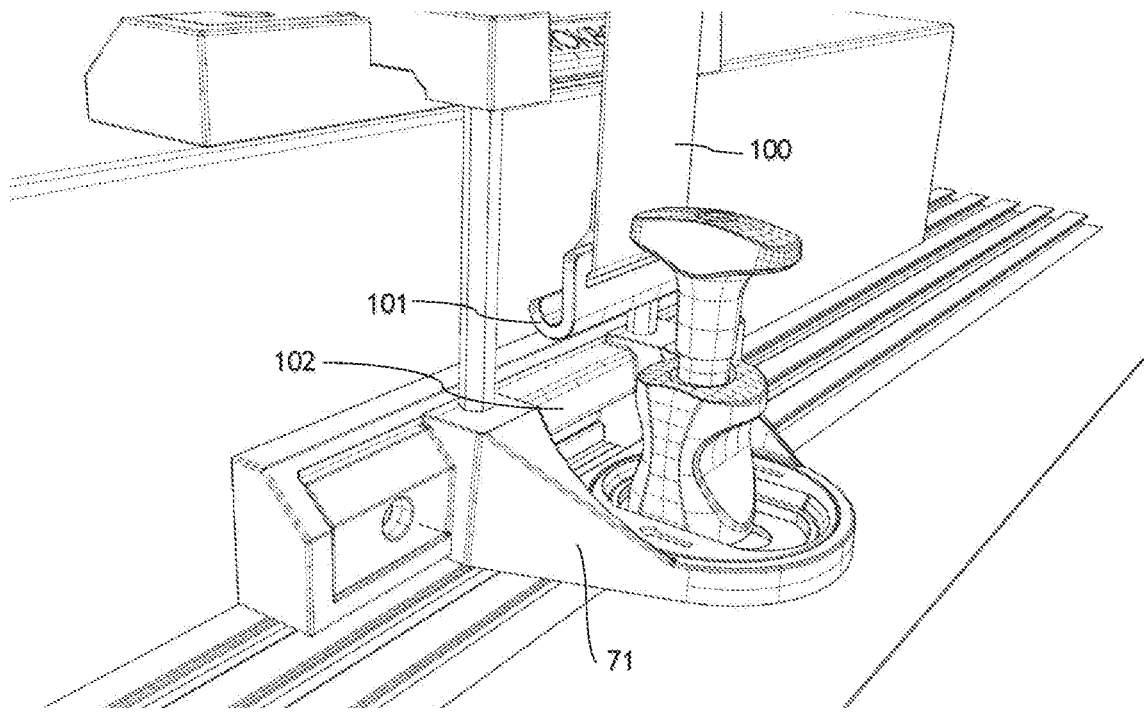
FIG. 19 depicts a detail of the arrangement shown in FIG. 18.

In an arrangement, as shown in FIG. 19, the ends of the strap 100 may include a hook 101 that is configured to engage a protrusion 102 on the base 71 of the clamp 70. The protrusion 102 may be appropriately oriented such that when the strap 100 is correctly located, the tension of the strap 100 pulls the hook 101 more tightly onto the protrusion 102, preventing it from being accidentally released. When the tension is released from the strap, the hook 101 may be easily released from the protrusion 102. In such an arrangement, respective sections of the strap 100 may be connected to the respective clamps 70 of a pair of clamps 70 on opposite sides of the artwork 45 and then the two sections of strap 100 may be secured to each other.

In an alternative arrangement, the base 71 of the clamp may include a bar that the strap 100 can pass around. This may secure the strap 100 to the clamp 70 when the strap 100 is pulled tight but permit the strap 100 to slide through the clamp 70, enabling adjustment. In such an arrangement, a first section of strap 100 may pass across an upper face 47 of artwork 45, pass around the bars provided on respective clamps 70 of a pair of clamps 70 on opposite sides of the artwork 45 and then return such that the two ends of the strap 100 can be secured to each other.

The strap 100 may be used to provide additional support for the artwork 45 when used in conjunction with an arrangement similar to that discussed above and depicted in FIGS. 9 to 17. In an arrangement, as shown in FIG. 18, the strap 100 may pass over the release 76 of the lock mechanism 75. In such an arrangement, the strap 100 may prevent operation of the release 76, namely such that the strap 100 must first be removed before the release 76 of the lock mechanism 75 can be operated. In an arrangement such as that depicted in FIG. 18, the tension within the strap 100 in use may further press on the lock mechanism 75 to further engage it, for example to increase the force with which the edges of the apertures 81 engage the rods 73.

Figure 20:
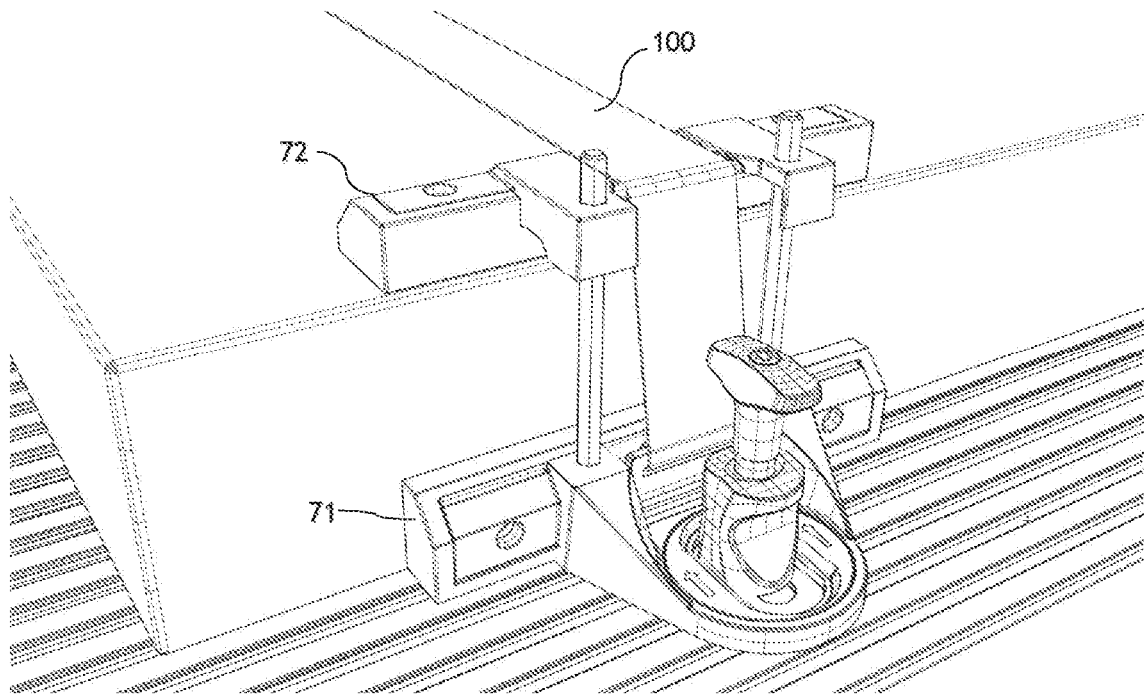
FIG. 20 depicts a further arrangement of the apparatus.

In an arrangement, a strap 100 such as that depicted in FIG. 20 may be used in place of the lock mechanism. In such an arrangement, the strap 100 may be used to secure the clamp 70 in the engaged state, namely, to hold the gripping section 72 against the artwork 45.

In an arrangement, sections of the strap 100 that are secured to each other, such as surfaces provided at or near the ends of the strap 100, may have sections of hook and eye material in order to secure the two sections of the strap 100 to each other. This may enable a firm fastening to be made between the two sections of the strap 100 regardless of the separation between the two clamps 70. Other means of securing the two ends of the strap 100 may also be used, such as mechanical latches or clamps. However, the use of hook and eye material may be preferable, not only because it provides near infinite adjustability but also because it avoids the requirement for a mechanical latch or clamp that, without appropriate care, may pose a risk of damage to the artwork.

Apparatus for holding artwork such as the arrangements discussed above may be configured to be housed in a container. In such an arrangement, the mounting panel (with the artwork mounted thereon) may be secured or held within the container. The container for housing such the apparatus may be a container such as described in WO 2018/115808.

For the avoidance of doubt, the verb "comprise" as used herein has its normal dictionary meaning, i.e., to denote non-exclusive inclusion. The use of the word "comprise" (or any of its derivatives) does not therefore exclude the possibility of further features being included.

All of the features disclosed in this specification (including the accompanying claims, and drawings) may also be combined in any combination (other than combinations where the features are mutually exclusive).

Each feature disclosed in this specification (including the accompanying claims and drawings) may be replaced by alternative features serving the same, equivalent or similar purpose, unless expressly stated otherwise. Thus, unless expressly stated otherwise, each feature disclosed is just an example of a generic series of features providing an equivalent or similar function.

The invention is not restricted to the details of the embodiments described. The invention extends to a container and/or apparatus which comprises one or more of the features referred to above, or any other novel concept, feature, or combination of the features disclosed herein.

We claim:
1. An apparatus for use in holding artwork during transportation or storage, comprising:
a substantially flat mounting panel provided with a plurality of retention members; and at least one clamp, configured to be moveable between an unengaged state, in which artwork can be removed from the apparatus, and an engaged state, in which the clamp secures the artwork to the apparatus;

wherein the clamp comprises a base, configured to be secured to the mounting panel, and a gripping section;

when artwork is secured to the apparatus, a first side of the artwork is supported on the mounting panel and the gripping section of the clamp presses on a second side of the artwork, opposite to the first side of the artwork;

wherein the clamp comprises at least one rod that extends from the base of the clamp in a direction perpendicular to the surface of the mounting panel; and the gripping section is configured to slide along the at least one rod to move between the unengaged state and the engaged state.

2. The apparatus according to claim 1, wherein the clamp comprises two rods.

3. The apparatus according to claim 1, wherein the gripping section comprises a lock mechanism that, when engaged, fixes the position of the gripping section relative to the at least one rod.

4. The apparatus according to claim 3, wherein, when the lock mechanism is engaged, the gripping section can be moved closer to the base of the clamp but cannot be moved further away from the base of the clamp.

5. The apparatus according to claim 3, wherein the lock mechanism comprises a release, configured such that, when a user operates the release, the lock mechanism disengages and the gripping section can be moved further away from the base of the clamp.

6. The apparatus according to any one of the preceding claims, wherein the base of the clamp comprises an abutment face, configured to engage with an edge of artwork secured to the apparatus.

7. The apparatus according to claim 1 wherein the base of the clamp is secured to the mounting panel by a securing device.

8. The apparatus according to claim 7, wherein the base of the clamp comprises an aperture; and wherein the securing device comprises an engagement part for engaging the base of the clamp and a locking part which is rotatable about an axis from a first angular position in which it can be located adjacent a respective retention member and a second angular position in which it engages with the respective retention member;

whereby the securing device can be used to secure the base of the clamp to the mounting panel by aligning the aperture in the base of the clamp relative to the retention member of the mounting panel, inserting the locking part through the aperture in the base of the clamp to a position adjacent the retention member so that the engagement part of the securing device engages a surface of the base of the clamp about the aperture therein, and rotating the locking part from the first angular position to the second angular position so the locking part engages with and is retained by said retention member.

9. The apparatus according to claim 8, wherein said locking part comprises one or more arms extending substantially perpendicular to said axis.

10. The apparatus according to claim 9, wherein the securing device comprises a handle at a proximal end whereby it can be rotated about said axis and the locking part at a distal end thereof.

11. The apparatus according to claim 8, wherein the retention members comprise a series of parallel slots or apertures in the mounting panel.

12. The apparatus according to claim 11, wherein the mounting panel comprises a series of flanges coplanar with a face of the panel separated by a series of parallel slots.

13. The apparatus according to claim 1, comprising at least one pair of clamps, configured to be arranged at opposite edges of artwork secured to the apparatus.

14. The apparatus according to claim 13, further comprising a strap extending between the clamps of said at least one pair.

15. The apparatus according to claim 13, wherein the bases of the clamps in said at least one pair have strap mounts configured to receive the strap and secure it to the base of the clamp.

16. The apparatus according to claim 14, wherein the strap comprises a section of hook and eye material configured such that a section of strap secured to one clamp can be attached to a section of strap secured to another clamp, regardless of the separation between the clamps.

17. The apparatus according to claim 1, wherein the clamp comprises at least one resilient pad mounted on a surface of the clamp that is configured to engage with the artwork.

18. The apparatus according to claim 1, wherein the clamp comprises a spacer, provided between the base of the clamp and the gripping section and configured to be able to move relative to at least one of the base of the clamp and the gripping section.

19. The apparatus according to claim 1, wherein the clamp comprises at least one extrusion, configured to be detachably attached to one of the base of the clamp, the gripping section and a spacer provided between the base of the clamp and the gripping section, and arranged to spread forces exerted between the artwork and said one of the base of the clamp, the gripping section and the spacer.

20. A container for holding artwork during transportation or storage, comprising the apparatus according to claim 1.

* * * * *